(12) United States Patent
Mizuta

(10) Patent No.: US 9,749,751 B2
(45) Date of Patent: Aug. 29, 2017

(54) ELECTRONIC DEVICE

(71) Applicant: KYOCERA CORPORATION, Kyoto (JP)

(72) Inventor: Satoshi Mizuta, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 70 days.

(21) Appl. No.: 14/771,035

(22) PCT Filed: Feb. 26, 2014

(86) PCT No.: PCT/JP2014/001023
§ 371 (c)(1),
(2) Date: Aug. 27, 2015

(87) PCT Pub. No.: WO2014/132639
PCT Pub. Date: Sep. 4, 2014

(65) Prior Publication Data
US 2016/0007123 A1    Jan. 7, 2016

(30) Foreign Application Priority Data

Feb. 27, 2013  (JP) ................................ 2013-037357
Feb. 27, 2013  (JP) ................................ 2013-037587
Feb. 27, 2013  (JP) ................................ 2013-037589

(51) Int. Cl.
*H04R 3/00* (2006.01)
*H04R 17/00* (2006.01)
(Continued)

(52) U.S. Cl.
CPC .............. *H04R 17/00* (2013.01); *H04M 1/03* (2013.01); *H04R 1/028* (2013.01);
(Continued)

(58) Field of Classification Search
USPC .......... 381/111, 113, 114, 151, 173, 190, 333
See application file for complete search history.

(56) References Cited

U.S. PATENT DOCUMENTS 8,861,755 B2    10/2014  Ando et al.
2010/0225600 A1  9/2010  Dai et al.
(Continued)

FOREIGN PATENT DOCUMENTS

JP       S61-158299 A    7/1986
JP       S63-007896 U    1/1988
(Continued)

OTHER PUBLICATIONS

The extended European search report issued by the European Patent Office dated Aug. 29, 2016, which corresponds to European Patent Application No. 14756399.3-1901 and is related to U.S. Appl. No. 14/771,035.

(Continued)

*Primary Examiner* — Yosef K Laekemariam
(74) *Attorney, Agent, or Firm* — Studebaker & Brackett PC

(57) ABSTRACT

An electronic device includes a vibration unit configured to generate a vibration sound transmitted by vibrating a contacting or pressing body part; and piezoelectric elements stacked on and attached to the vibration unit and vibrating the vibration unit in accordance with an input signal. The piezoelectric elements each have a different capacitance. Voltage of the input signal to the piezoelectric elements is varied in accordance with frequency band, thereby suppressing power consumption.

14 Claims, 21 Drawing Sheets

(51) Int. Cl.
*H04M 1/03* (2006.01)
*H04R 1/02* (2006.01)

(52) U.S. Cl.
CPC ...... *H04R 2400/03* (2013.01); *H04R 2460/13* (2013.01); *H04R 2499/11* (2013.01)

(56) References Cited

U.S. PATENT DOCUMENTS

2013/0077443 A1* 3/2013 Onishi ............... B06B 1/06
                                                     367/99
2014/0091872 A1* 4/2014 Itasaka ............. H03L 1/028
                                                     331/36 C
2014/0119576 A1    5/2014 Ando et al.

FOREIGN PATENT DOCUMENTS

| | | |
|---|---|---|
| JP | 2004-187031 A | 7/2004 |
| JP | 2005-348193 A | 12/2005 |
| JP | 2007-082009 A | 3/2007 |
| JP | 2009-177751 A | 8/2009 |
| JP | 2011-091719 A | 5/2011 |
| JP | 2012-015755 A | 1/2012 |
| JP | 2012/217026 A | 11/2012 |
| WO | 2010/106736 A1 | 9/2010 |
| WO | 2012/108448 A1 | 8/2012 |

OTHER PUBLICATIONS

International Search Report and Written Opinion of the International Searching Authority; PCT/JP2014/001023; dated Jun. 10, 2014.

\* cited by examiner

FIG. 3

|  | Piezoelectric element 30 (1 μF) | Piezoelectric element 31 (2 μF) |
|---|---|---|
| Low range (up to 700 Hz) | ±10V | ±(10V+α)V |
| Middle range (700 Hz to 1500 Hz) | ±10V | ±10V |
| High range (1500 Hz and up) | ±10V | ±(10V−β)V |

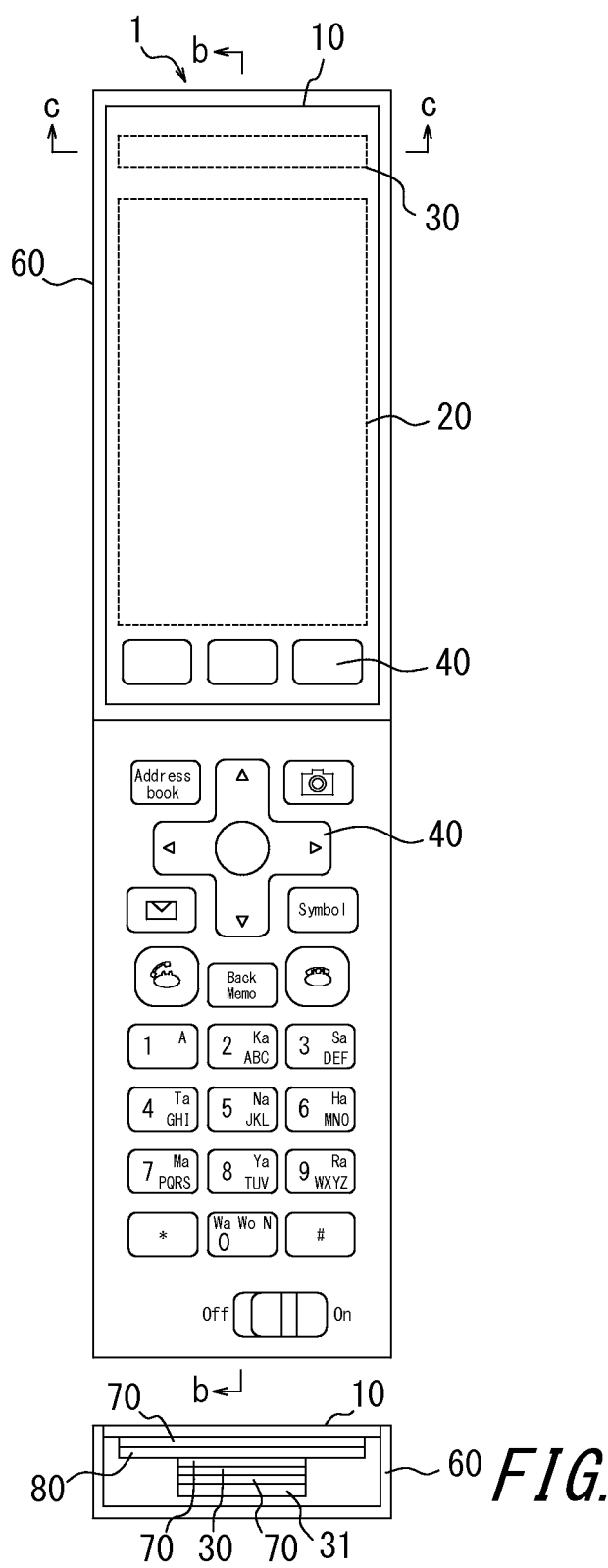
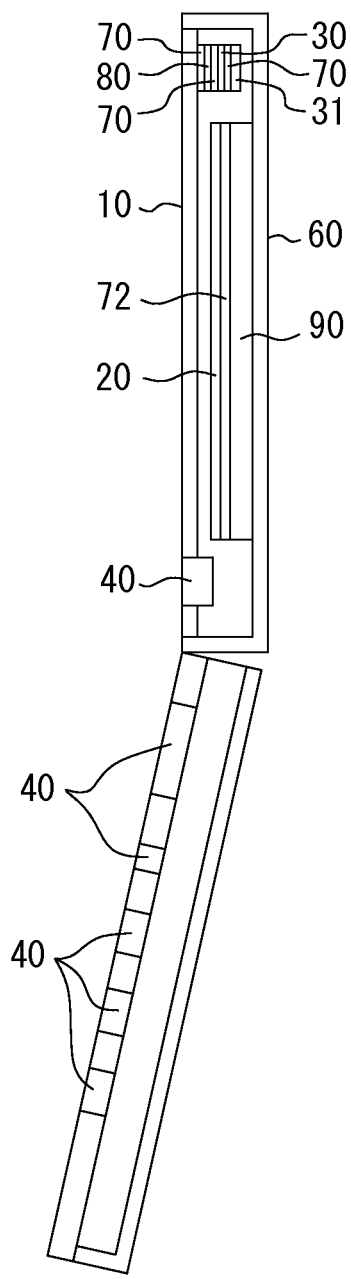
FIG. 7A  FIG. 7B  FIG. 7C

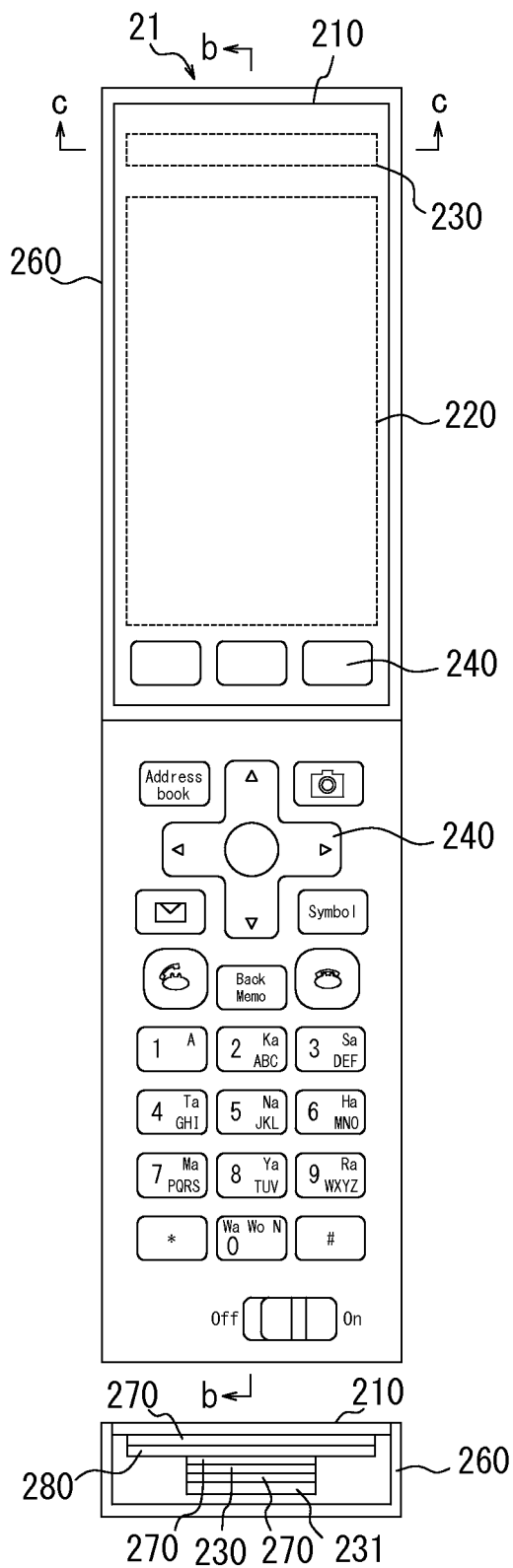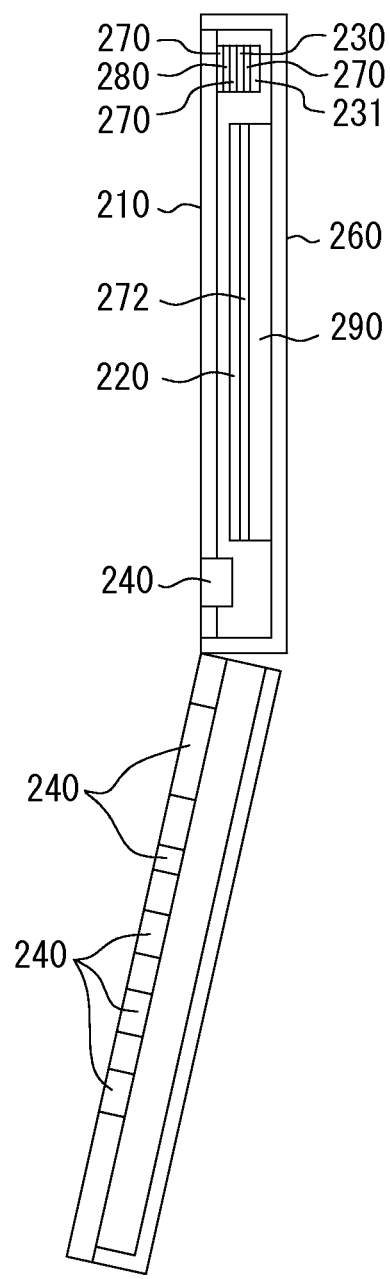
FIG. 22A  FIG. 22B  FIG. 22C

ELECTRONIC DEVICE

CROSS-REFERENCE TO RELATED APPLICATION

This application claims priority to and the benefit of Japanese Patent Applications No. 2013-037587 filed Feb. 27, 2013, No. 2013-037589 filed Feb. 27, 2013, and No. 2013-037357 filed Feb. 27, 2013, the entire contents of which are incorporated herein by reference.

TECHNICAL FIELD

This disclosure relates to an electronic device that vibrates a vibration unit via a piezoelectric element by applying a predetermined electric signal (audio signal) to the piezoelectric element so as to generate vibration sound transmitted by vibrating a part of a human body.

BACKGROUND

JP 2005-348193 A (PTL 1) discloses an electronic device, such as a mobile phone or the like, that transmits air-conducted sound and bone-conducted sound to a user. As the air-conducted sound, PTL 1 discloses a sound that is transmitted to the user's auditory nerve by air vibrations, caused by a vibrating object, that are transmitted through the external ear canal to the eardrum and cause the eardrum to vibrate. As vibration sound, PTL 1 discloses a sound that is transmitted to the user's auditory nerve through a portion of the user's body (such as the cartilage of the outer ear) that is contacting a vibrating object.

In the telephone disclosed in PTL 1, a rectangular vibrating body, formed from a piezoelectric element (bimorph) and a flexible substance, is attached to an outer surface of a housing via an elastic member. PTL 1 also discloses that the vibrating body functions as a vibration unit as follows. When voltage is applied to the piezoelectric element in the vibration unit, the piezoelectric material expands and contracts in the longitudinal direction, causing the vibrating body to undergo bending vibration. Air-conducted sound and vibration sound are transmitted to the user when the user contacts the vibrating body to the auricle.

CITATION LIST

Patent Literature

PTL 1: JP 2005-348193 A

SUMMARY

Technical Problem

In the electronic device disclosed in PTL 1, power consumption of the piezoelectric element attached to the vibration unit is not taken into consideration. In the electronic device disclosed in PTL 1, the frequency characteristic of the piezoelectric element attached to the vibration unit is also not taken into consideration. Furthermore, in the electronic device disclosed in PTL 1, the thickness of the piezoelectric element attached to the vibration unit is not taken into consideration.

As an electronic device that generates vibration sound by vibrating a vibration unit via a piezoelectric element, it could therefore be helpful to provide an electronic device that takes into consideration the power consumption of the piezoelectric element. As an electronic device that generates vibration sound by vibrating a vibration unit via a piezoelectric element, it could also be helpful to provide an electronic device that takes into consideration the frequency characteristic of the piezoelectric element. Furthermore, as an electronic device that generates vibration sound by vibrating a vibration unit via a piezoelectric element, it could be helpful to provide an electronic device that takes into consideration the thickness of the piezoelectric element.

Solution to Problem

An electronic device according to one disclosed aspect includes a vibration unit configured to generate a vibration sound transmitted by vibrating a contacting or pressing body part; and a plurality of piezoelectric elements stacked on and attached to the vibration unit and vibrating the vibration unit in accordance with an input signal, the piezoelectric elements each having a different capacitance, such that voltage of the input signal to the piezoelectric elements is varied in accordance with frequency band. The electronic device may further include a controller configured to control the voltage of the input signal to the piezoelectric elements.

In the above electronic device, a first signal may be input to a first piezoelectric element, a second signal may be input to a second piezoelectric element that has a larger capacitance than the first piezoelectric element, voltage of the second signal may be equal to or greater than voltage of the first signal in a first frequency band, and the voltage of the second signal may be less than the voltage of the first signal in a second frequency band that is higher than the first frequency band.

The piezoelectric elements may each have a different shape. Furthermore, the piezoelectric elements may be rectangular, and each piezoelectric element may have at least one side with a different length. The piezoelectric elements may each have a different thickness in a stacking direction. Furthermore, the piezoelectric elements may be laminated piezoelectric elements each having a different number of layers.

The vibration unit may be a panel, and the vibration unit may be larger than an ear.

The vibration unit may include a display. The piezoelectric elements may be attached to a different position than an attachment position of the display in the vibration unit.

The vibration unit may transmit the vibration sound by vibrating a pressing body part even when the vibration unit is pressed by the body part with a force of 3 N or more. Furthermore, the vibration unit may transmit the vibration sound by vibrating a pressing body part even when the vibration unit is pressed by the body part with a force of 5 N or more. The vibration unit may also transmit the vibration sound by vibrating a pressing body part even when the vibration unit is pressed by the body part with a force of 10 N or less.

An electronic device according to another disclosed aspect includes a vibration unit configured to generate a vibration sound transmitted by vibrating a contacting or pressing body part; and a plurality of piezoelectric elements stacked on and attached to the vibration unit and vibrating the vibration unit, the piezoelectric elements each having a different resonance frequency.

The piezoelectric elements may each have a different shape. Furthermore, the piezoelectric elements may be rectangular, and each piezoelectric element may have at least one side with a different length. The piezoelectric elements may each have a different thickness in a stacking direction.

Furthermore, the piezoelectric elements may be laminated piezoelectric elements each having a different number of layers.

The vibration unit may be a panel, and the vibration unit may be larger than an ear.

The vibration unit may include a display. The piezoelectric elements may be attached to a different position than an attachment position of the display in the vibration unit.

The vibration unit may transmit the vibration sound by vibrating a pressing body part even when the vibration unit is pressed by the body part with a force of 3 N or more. Furthermore, the vibration unit may transmit the vibration sound by vibrating a pressing body part even when the vibration unit is pressed by the body part with a force of 5 N or more. The vibration unit may also transmit the vibration sound by vibrating a pressing body part even when the vibration unit is pressed by the body part with a force of 10 N or less.

An electronic device according to yet another disclosed aspect includes a vibration unit configured to generate a vibration sound transmitted by vibrating a contacting or pressing body part; and a plurality of laminated piezoelectric elements stacked on and attached to the vibration unit and vibrating the vibration unit, the piezoelectric elements each having a different thickness in a stacking direction.

A first piezoelectric element may be attached to the vibration unit, a second piezoelectric element may be stacked on and attached to the first piezoelectric element, and the second piezoelectric element may be thicker than the first piezoelectric element. A first piezoelectric element may be attached to the vibration unit, a second piezoelectric element may be stacked on and attached to the first piezoelectric element, and the second piezoelectric element may be thinner than the first piezoelectric element.

The piezoelectric elements may each have a number of layers in accordance with thickness.

The vibration unit may be a panel, and the vibration unit may be larger than an ear.

The vibration unit may include a display panel. The piezoelectric elements may be attached to a different position than an attachment position of the display panel in the vibration unit.

The vibration unit may transmit the vibration sound by vibrating a pressing body part even when the vibration unit is pressed by the body part with a force of 3 N or more. Furthermore, the vibration unit may transmit the vibration sound by vibrating a pressing body part even when the vibration unit is pressed by the body part with a force of 5 N or more. The vibration unit may also transmit the vibration sound by vibrating a pressing body part even when the vibration unit is pressed by the body part with a force of 10 N or less.

Advantageous Effect

According to the below-described embodiments, it is possible to provide an electronic device that generates vibration sound by vibrating a vibration unit via piezoelectric elements and that takes into consideration the power consumption of the piezoelectric elements. According to the below-described embodiments, it is also possible to provide an electronic device that generates vibration sound by vibrating a vibration unit via piezoelectric elements and that takes into consideration the resonance frequency of the piezoelectric elements. Furthermore, according to the below-described embodiments, it is possible to provide an electronic device that generates vibration sound by vibrating a vibration unit via piezoelectric elements and that takes into consideration the thickness of the piezoelectric elements.

BRIEF DESCRIPTION OF THE DRAWINGS

In the accompanying drawings:

FIG. 3 illustrates operations by a controller;

FIGS. 7A, 7B, and 7C illustrate a housing structure of an electronic device according to Embodiment 2;

FIGS. 22A, 22B, and 22C illustrate a housing structure of an electronic device according to Embodiment 6;

DETAILED DESCRIPTION

The disclosed embodiments are described below in detail with reference to the accompanying drawings. The below-described embodiments may be implemented independently or in combination.

Figure 1:
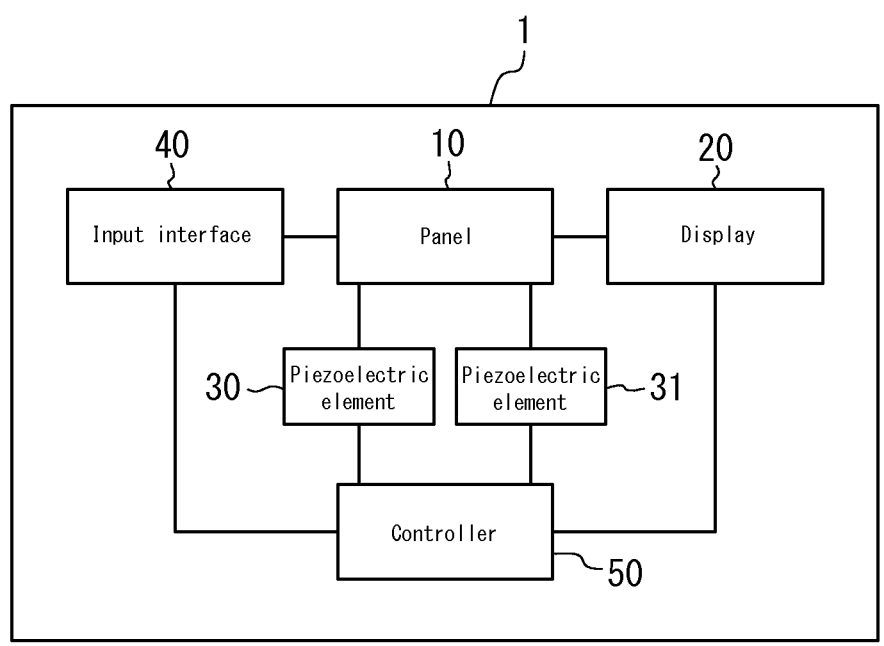
FIG. 1 is a functional block diagram of an electronic device.

FIG. 1 is a functional block diagram of an electronic device 1 according to one of the disclosed embodiments. The electronic device 1 is, for example, a mobile phone (smartphone) and is provided with a panel 10, a display 20, piezoelectric elements 30 and 31, an input interface 40, and a controller 50.

The panel 10 is a touch panel that detects contact, a cover panel that protects the display 20, or the like. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display 20 is a display device such as a liquid crystal display, an organic EL display, an inorganic EL display, or the like. The display 20 is provided on the back face of the panel 10. The display 20 is arranged on the back face of the panel 10. The display 20 may be adhered to the panel 10 by a joining member (for example, adhesive) or disposed at a distance from the panel 10 and supported by the housing of the electronic device 1.

The piezoelectric elements 30 and 31 are formed by elements that, upon application of an electric signal (voltage), either expand and contract or bend (flex) in accordance with the electromechanical coupling coefficient of their constituent material. Ceramic or crystal elements, for example, may be used. The piezoelectric elements 30 and 31 are, for example, unimorph elements or bimorph elements. Unimorph elements expand and contract upon the application of an electric signal (voltage), and bimorph elements bend upon the application of an electric signal (voltage). The piezoelectric elements 30 and 31 may be laminated piezoelectric elements. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers.

The piezoelectric elements 30 and 31 have different capacitances. The piezoelectric elements 30 and 31 are provided with different capacitances by having different shapes. For example, when the piezoelectric elements 30 and 31 are rectangular, the length of at least one side and/or the thickness (the layer thickness or the number of layers in the case of laminated piezoelectric elements) may differ. Alternatively, the piezoelectric elements 30 and 31 may be formed from different materials so that the capacitances differ. As described below in detail, the input signal to the piezoelectric elements 30 and 31 is controlled in accordance with the frequency band.

The piezoelectric elements 30 and 31 are disposed on the back face of the panel 10 (the face on the inner side of the electronic device 1). The first piezoelectric element 30 is, for example, attached to the panel 10 by a joining member (for example, double-sided tape). The piezoelectric element 30 may be attached to the panel 10 with an intermediate member (for example, sheet metal) therebetween. The second piezoelectric element 31 is stacked on and attached to the first piezoelectric element 30. The piezoelectric element 31 is, for example, attached to the piezoelectric element 30 by a joining member (for example, double-sided tape).

The input interface 40 accepts operation input from the user and may be configured, for example, using operation buttons (operation keys). Note that when the panel 10 is a touch panel, the panel 10 can also accept operation input from the user by detecting contact by the user.

The controller 50 is a processor that controls the electronic device 1. The controller 50 applies a predetermined electric signal (a voltage corresponding to an audio signal) to the piezoelectric elements 30 and 31. The voltage that the controller 50 applies to the piezoelectric elements 30 and 31 may, for example, be ±15 V. This is higher than ±5 V, i.e. the applied voltage of a so-called panel speaker for conduction of sound by air-conducted sound rather than vibration sound. In this way, even if the user contacts or presses (pushes) the panel 10 against the user's body with a force of 3 N or greater (for example, a force of 5 N to 10 N), sufficient vibration is generated in the panel 10, so that by vibrating a part of the user's body, i.e. a contacting part or a pressing part, a vibration sound can be generated via that part. Note that the magnitude of the applied voltage used may be appropriately adjusted in accordance with the fixation strength of the panel 10 with respect to the housing or a support member, or in accordance with the performance of the piezoelectric element 30.

Upon the controller 50 applying the electric signal to the piezoelectric elements 30 and 31, the piezoelectric elements 30 and 31 expand and contract or bend in accordance with the voltage (amplitude) and period of the applied electric signal. At this point, the panel 10 to which the piezoelectric elements 30 and 31 are attached deforms in conjunction with the expansion and contraction or bending of the piezoelectric elements 30 and 31. The panel 10 thus vibrates. The panel 10 flexes due to expansion and contraction or to bending of the piezoelectric elements 30 and 31. The panel 10 is bent directly by the piezoelectric elements 30 and 31. Stating that "the panel 10 is bent directly by the piezoelectric elements" differs from the phenomenon utilized in known panel speakers, whereby the panel deforms upon vibration of a certain region of the panel due to the inertial force of a piezoelectric actuator constituted by a piezoelectric element disposed in the casing. Stating that "the panel 10 is bent directly by the piezoelectric elements" refers instead to how expansion and contraction or bending (flexure) of the piezoelectric elements directly bends the panel via the joining member or via the joining member and the below-described reinforcing member 80. Therefore, along with generating air-conducted sound, the panel 10 generates vibration sound via a part of the user's body when the user brings a part of the body (such as the cartilage of the outer ear) into contact. The controller 50 can apply an electric signal, corresponding to an audio signal related to the other party's voice, to the piezoelectric elements 30 and 31 to generate air-conducted sound and vibration sound that correspond to the audio signal. The audio signal may be related to ringtones, music including songs, or the like. Note that the audio signal pertaining to the electric signal may be based on music data stored in internal memory of the electronic device 1, or may be music data stored on an external server or the like and played back over a network.

Furthermore, the controller 50 controls the voltage (amplitude) of the electric signal applied to the piezoelectric elements 30 and 31 so as to vary in accordance with the frequency band of output audio. In greater detail, control is performed so that between the piezoelectric elements 30 and 31, the voltage of the electric signal applied to the piezoelectric element with the larger capacitance is increased at low range, and the voltage of the electric signal applied to the piezoelectric element with the larger capacitance is decreased at high range. As a structure for such control, the controller 50 is, for example, provided with an amplifier that, in accordance with the frequency band, variably controls the electric signal of the piezoelectric element, between the piezoelectric elements 30 and 31, with the larger capacitance. The controller 50 may also include a Digital Signal Processor (DSP) that controls the electric signal for each of the piezoelectric elements 30 and 31.

The panel 10 is rectangular, for example, and vibrates not only in the region in which the piezoelectric elements 30 and 31 are attached, but also in a region separate from the attachment region. In the region of vibration, the panel 10 includes a plurality of locations at which the panel 10 vibrates in a direction intersecting the main surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly over nearly the entire panel 10. In other words, a plurality of vibration waves are detected across the entire panel 10. The voltage that the controller 50 applies to the piezoelectric elements 30 and 31 may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

Figure 2:
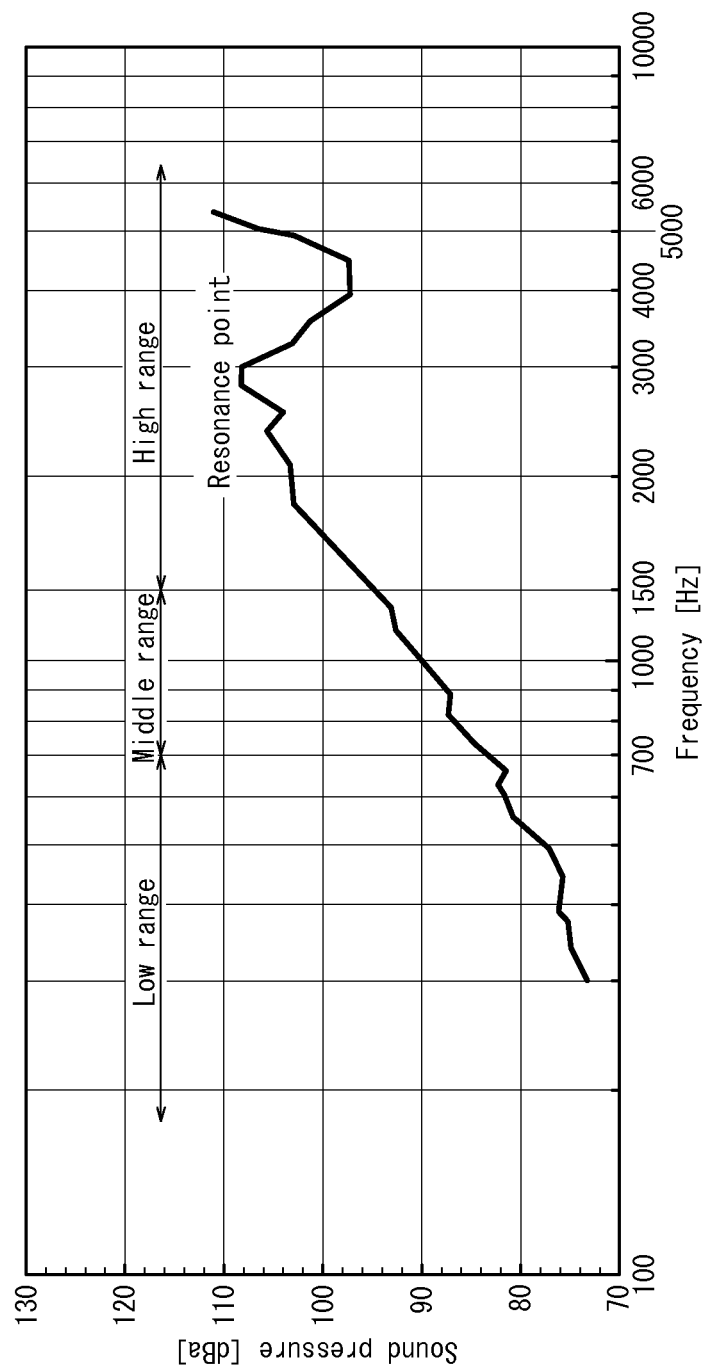
FIG. 2 illustrates the frequency characteristics of piezoelectric elements.

With reference to FIG. 2, the effects of the above-described control by the controller 50 are explained. FIG. 2 illustrates an example of the sound pressure frequency characteristic of the piezoelectric elements 30 and 31. The horizontal axis represents the frequency of the output audio, and the vertical axis represents sound pressure. The sound pressure frequency characteristic has an overall shape such that sound pressure rises as frequency increases and has a resonance point near 3000 Hz. Accordingly, at a relatively high range (for example, a frequency band of 1500 Hz or more), the sound pressure of the generated audio increases even when the voltage of the electric signal applied to the piezoelectric elements 30 and 31 is the same. Therefore, at a high range, a small voltage suffices for achieving a predetermined sound pressure. Hence, by setting the voltage of the electric signal applied to the piezoelectric elements 30 and 31 to be small at a high range, it is possible to suppress the current consumed by the piezoelectric element 30 or 31 and therefore reduce power consumption, while guaranteeing a predetermined sound pressure. Since the current consumption by the piezoelectric elements 30 and 31 increases as the capacitance is larger, a larger current can be suppressed by decreasing the voltage of the piezoelectric element, between the piezoelectric elements 30 and 31, that has the larger capacitance. The power consumption can thus be reduced more efficiently.

FIG. 3 illustrates an example of operations of the controller 50. The controller 50 controls the electric signals as illustrated in FIG. 3, where output audio of less than 700 Hz is defined as low range, 700 Hz or more and less than 1500 Hz as middle range, and 1500 Hz or more as high range. For example, assume the capacitance of the piezoelectric element 30 is 1 µF, and the capacitance of the piezoelectric element 31 is 2 µF. To the piezoelectric element 30, which has the smaller capacitance, the controller 50 applies an electric signal of ±10 V in the low range to high range. To the piezoelectric element 31, which has the larger capacitance, the controller 50 applies the same electric signal as for the piezoelectric element 30 in the middle range, i.e. ±10 V, but applies an electric signal of ±(10+β) V in the high range (where β is any positive number 10 or less). In other words, the voltage of the electric signal is suppressed. In this way, the current consumption of the piezoelectric element 31 is suppressed, thereby reducing the overall power consumption of the piezoelectric elements 30 and 31. Furthermore, in accordance with the sound pressure frequency characteristic, the controller 50 may increase the voltage of the electric signal applied to the piezoelectric element 31 in the low range by applying an electric signal of ±(10+α) V (where α is any positive number). The overall power consumption can be suppressed by performing control so that the amount of current reduction in the high range is greater than the amount of current increase in the low range. While the value of α above is any positive number, α is preferably set based on the voltage that can be applied to the piezoelectric elements 30 and 31 (performance of the piezoelectric elements 30 and 31), the voltage increase that can be achieved by a non-illustrated power amp, or the voltage that avoids a state in which the sound pressure of sound generated by the panel reaches an upper limit and no longer changes.

Figure 4:
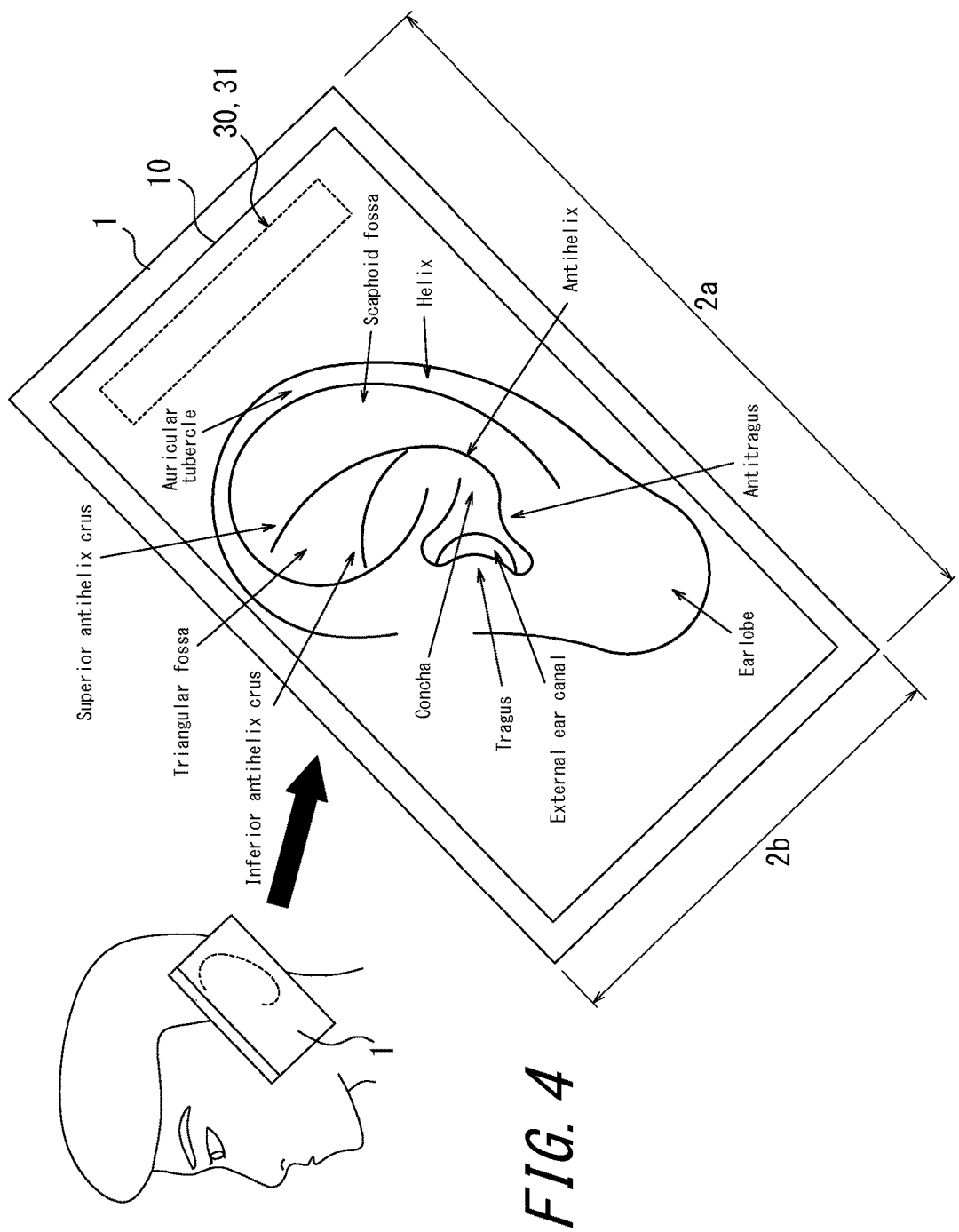
FIG. 4 illustrates an example of panel shape and size.

FIG. 4 illustrates an example of the shape and size of the panel 10. The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 that vibrates may be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix.

In this example, the direction of length is a longitudinal direction 2a in which the panel 10 extends. Along this direction, the piezoelectric elements 30 and 31 are disposed toward one end from the center of the panel 10. The direction of width is a direction 2b orthogonal to the longitudinal direction. The region with such a length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is at least as large as the average size of a Japanese person's ear, it is thought that the panel 10 will be a size capable of covering the entire ear of most non-Japanese people. By including a region with the above-described dimensions and shape, the panel 10 can cover the user's ear and has tolerance for misalignment when placed against the ear. This region includes at least the region from the lower edge of the piezoelectric elements 30 and 31 to the midpoint of the panel 10 in the longitudinal direction 2a.

By vibration of the panel 10, the electronic device 1 can transmit vibration sound transmitted through a part of the user's body (such as the cartilage of the outer ear) and air-conducted sound to the user. In this example, the panel 10 is the vibration unit. Therefore, when sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

The electronic device 1 transmits vibration sound by vibration of the panel 10, and therefore even if the user is wearing earphones or headphones, for example, the user can hear sound through the earphones or headphones and through a part of the body by contacting the electronic device 1 against the earphones or headphones.

The electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port may be blocked by a member permeable by gas but not liquid. Gore-Tex (registered trademark) is an example of a member permeable by gas but not liquid.

Embodiment 1

Figure 5A:
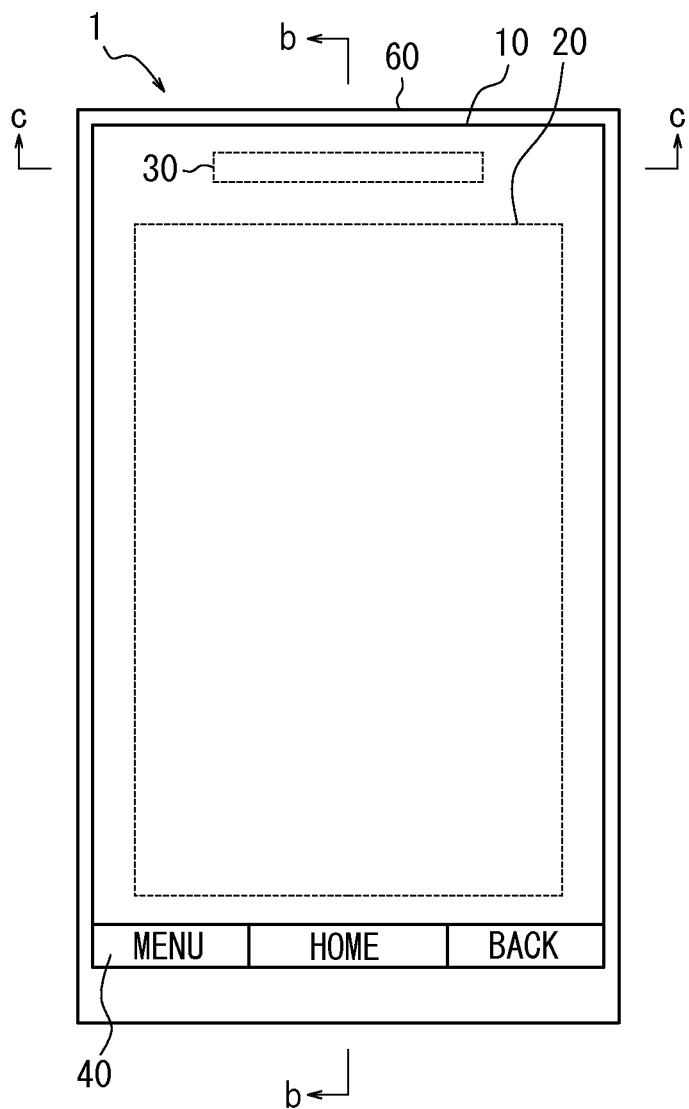
FIGS. 5A, 5B, and 5C illustrate a housing structure of an electronic device according to Embodiment 1.
Figure 5B:
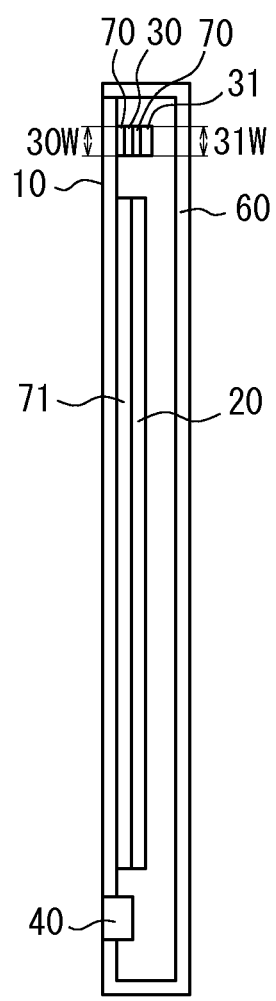
Figure 5C:
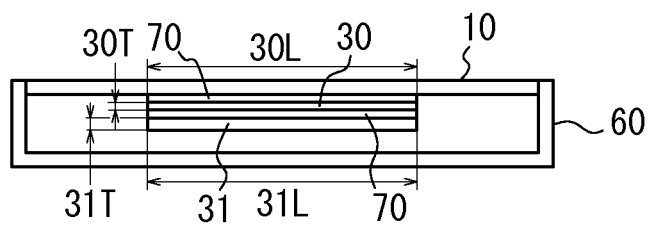

FIGS. 5A, 5B, and 5C illustrate a housing structure of the electronic device 1 according to Embodiment 1. FIG. 5A is a front view, FIG. 5B is a cross-sectional view along the b-b line of FIG. 5A, and FIG. 5C is a cross-sectional view along the c-c line of FIG. 5A. The electronic device 1 illustrated in FIGS. 5A to 5C is a smartphone in which a touch panel that is a glass plate is disposed on the front face of a housing 60 (for example a metal or resin case) as the panel 10.

The panel 10 and the input interface 40 are supported by the housing 60, and the display 20 and piezoelectric elements 30 and 31 are each attached to the panel 10. The panel 10, display 20, and piezoelectric element 30 are each generally rectangular.

The display 20 is disposed in approximately the center in the transverse direction of the panel 10 and is attached to the panel 10 by a joining member 71. The joining member 71 may be adhesive with thermosetting properties, ultraviolet curable properties, or other such properties and may, for example, be optical elasticity resin, which is clear and colorless acrylic ultraviolet curing adhesive. The display 20 is preferably adhered to the panel 10 over the entire surface in contact with the panel 10. The rigidity of a vibrating plate 100 can thus be increased in a portion where the display 20 is adhered to the panel 10.

The piezoelectric elements 30 and 31 are disposed at a predetermined distance from an edge of the panel 10 in the longitudinal direction, near the edge so that the longitudinal direction of the piezoelectric elements 30 and 31 is aligned with the short sides of the panel 10. The display 20 and the piezoelectric elements 30 and 31 are disposed side by side, in parallel directions, on the inner face of the panel 10.

The piezoelectric elements 30 and 31 are stacked on and attached to the panel 10. For example, the first piezoelectric element 30 may be adhered to the panel 10 by a joining member 70. The second piezoelectric element 31 may also be stacked on and adhered to the first piezoelectric element 30 by the joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. By using double-sided tape that has elasticity, a degree of freedom of deformation of each of the piezoelectric elements 30 and 31 can be guaranteed while making it difficult for the piezoelectric elements 30 and 31 to detach from the joining member due to deformation of the joining member caused by deformation of both of the piezoelectric elements 30 and 31. Alternatively, adhesive with thermosetting properties, ultraviolet curable properties, or other such properties may be used as the joining member 70. As a result, the piezoelectric elements 30 and 31 can be adhered in a state such that thermal stress contraction does not easily occur between the piezoelectric element 30 and the panel 10 or between the piezoelectric elements 30 and 31. Furthermore, the joining member 70 used between the piezoelectric element 30 and the panel 10 and the joining member 70 used between the piezoelectric elements 30 and 31 may be formed from different types of material.

The piezoelectric elements 30 and 31 are separated from the inner surface of the housing 60 by a predetermined distance. The piezoelectric elements 30 and 31 are preferably separated from the inner surface of the housing 60 by the predetermined distance even when expanding and contracting or bending. In other words, the distance between the piezoelectric elements 30 and 31 and the inner face of the housing 60 is preferably larger than the maximum amount of deformation of the piezoelectric elements 30 and 31.

In Embodiment 1, the piezoelectric elements 30 and 31 have different capacitances. For example, the piezoelectric elements 30 and 31 may be provided with different capacitances by at least one of the following dimensions of the piezoelectric elements 30 and 31 differing: the lengths 30L and 31L in the longitudinal direction, the widths 30W and 31W in a direction intersecting the longitudinal direction, and the thicknesses 30T and 31T in the stacking direction. Furthermore, when the piezoelectric elements 30 and 31 are configured with laminated unimorph or bimorph elements, the overall thicknesses 30T and 31T of the elements may be caused to differ by varying the thickness of each layer when the piezoelectric elements have the same number of layers or by varying the number of layers when each layer has the same thickness. As a result, the capacitances can be caused to differ. Alternatively, the capacitances may be caused to differ by forming the piezoelectric elements 30 and 31 from different materials. By the controller 50 controlling the voltage of the electric signal applied to the piezoelectric element with the larger capacitance in accordance with the frequency band, power consumption can be reduced while guaranteeing a predetermined sound pressure. The piezoelectric element with the larger capacitance may be either the piezoelectric element 30 that is closer to the panel 10 in the stacking direction or the piezoelectric element 31 that is farther from the panel 10.

Figure 6:
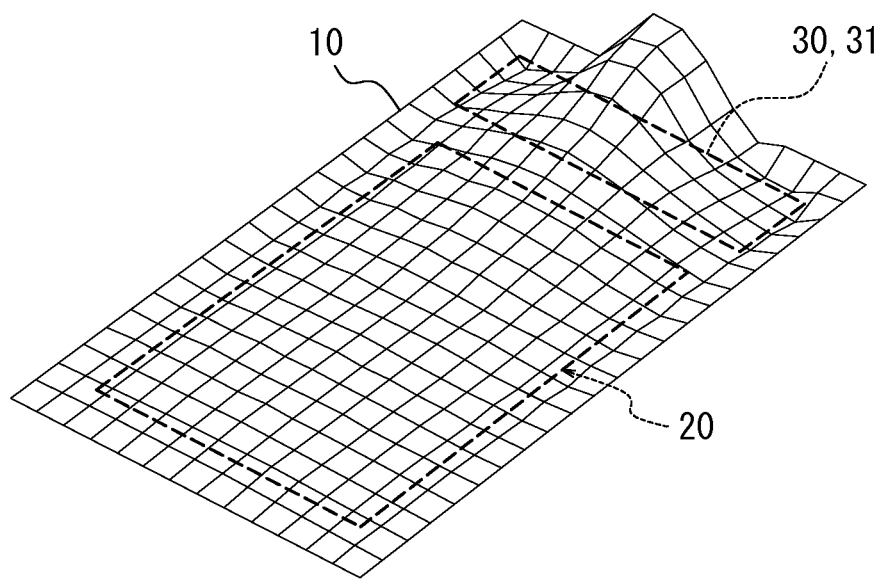
FIG. 6 illustrates an example of panel vibration in Embodiment 1.

FIG. 6 illustrates an example of vibration of the panel 10 in the electronic device 1 according to Embodiment 1. In the electronic device 1 according to Embodiment 1, the display 20 is attached to the panel 10. Therefore, it is more difficult for the lower part of the panel 10 to vibrate as compared to the upper part of the panel 10 where the piezoelectric elements 30 and 31 are attached. As a result, at the lower part of the panel 10, sound leakage due to vibration of the lower part of the panel 10 is reduced. The upper part of the panel 10 is bent directly by the piezoelectric elements 30 and 31, and hence vibration is damped at the lower part as compared to the upper part. In the direction of the long sides of the piezoelectric elements 30 and 31, the portion of the panel 10 immediately above the piezoelectric elements 30 and 31 rises the highest as compared to adjacent portions.

In the electronic device 1 according to Embodiment 1, the panel 10 thus deforms in conjunction with deformation of the piezoelectric elements 30 and 31 attached to the back face of the panel 10, so that air-conducted sound and vibration sound can be transmitted to an object that contacts the deforming panel 10. As a result, air-conducted sound and vibration sound can be transmitted to the user without projecting the vibration unit from the outer surface of the housing 60, thereby improving usability over the electronic device disclosed in PTL 1, in which a vibrating body extremely small as compared to the housing is pressed against a human body. The piezoelectric elements also do not damage easily, since the user's ear need not be pressed against the piezoelectric elements themselves. Moreover, causing the housing 60 rather than the panel 10 to deform makes it easier for the user to drop the terminal when vibration is generated, whereas vibrating the panel 10 makes such dropping of the terminal unlikely.

Embodiment 2

FIGS. 7A, 7B, and 7C illustrate a housing structure of the electronic device 1 according to Embodiment 2. FIG. 7A is a front view, FIG. 7B is a cross-sectional view along the b-b line of FIG. 7A, and FIG. 7C is a cross-sectional view along the c-c line of FIG. 7A. The electronic device 1 illustrated in FIGS. 7A to 7C is a clamshell mobile phone in which a cover panel (an acrylic plate) protecting the display 20 is disposed on the front face at the upper side of the housing 60 as the panel 10.

In Embodiment 2, a reinforcing member 80 is disposed between the panel 10 and the piezoelectric element 30. The reinforcing member 80 is, for example, an elastic member such as rubber, silicone, or the like. The reinforcing member 80 may, for example, be a metal plate formed from aluminum or the like and having a certain degree of elasticity. The reinforcing member 80 may also, for example, be a resin plate. Examples of the resin used to form such a resin plate include a polyamide resin. Examples of a polyamide resin include Reny (registered trademark), which is formed from crystalline thermoplastic resin obtained from m-Xylylenediamine and adipic acid and has excellent strength and elasticity. Such a polyamide resin may be used as a base polymer and reinforced by glass fiber, metallic fiber, carbon fiber, or the like to yield a reinforced resin. The strength and elasticity may be appropriately adjusted in accordance with the amount of glass fiber, metallic fiber, carbon fiber, or the like added to the polyamide resin. The above-described reinforced resin may, for example, be formed by interweaving glass fiber, metallic fiber, carbon fiber, or the like into a substrate, impregnating the substrate with resin, and allowing the resin to harden. The reinforced resin may be formed by mixing finely cut fibers into liquid resin and then allowing the resin to harden. The reinforced resin may also be a laminate of a substrate with interwoven fiber and a resin layer.

The piezoelectric elements 30 and 31 are stacked on and attached to the panel 10. For example, the second piezoelectric element 31 and the first piezoelectric element 30 may be adhered by the joining member 70, the first piezoelectric element 30 and the reinforcing member 80 may be adhered by the joining member 70, and the reinforcing member 80 and the panel 10 may be adhered by the joining member 70. The joining member 70 is adhesive with thermosetting properties, ultraviolet curable properties, or other such properties; double-sided tape; or the like. The piezoelectric elements 30 and 31 are disposed at a predetermined distance from an edge of the panel 10 in the longitudinal direction, near the edge so that the longitudinal direction of the piezoelectric elements 30 and 31 is aligned with the short sides of the panel 10.

In Embodiment 2 as well, the piezoelectric elements 30 and 31 have different capacitances. By the controller 50 controlling the voltage of the electric signal applied to the piezoelectric element with the larger capacitance in accordance with the frequency band, power consumption can be reduced while guaranteeing a predetermined sound pressure.

In Embodiment 2, the display 20 is supported by the housing 60. In other words, in the electronic device 1 according to Embodiment 2, the display 20 is adhered to a support 90, which is a portion of the housing 60, by a joining member 72. The support 90 is not limited to being a portion of the housing 60 and may be configured using metal, resin, or the like to be a member independent from the housing 60.

In the electronic device 1 according to Embodiment 2, the reinforcing member 80 and the panel 10 deform in conjunction with deformation of the piezoelectric elements 30 and 31 attached to the panel 10 via the reinforcing member 80, so that air-conducted sound and vibration sound are transmitted to an object that contacts the deforming panel 10. As a result, air-conducted sound and vibration sound can be transmitted to the user without the user's ear being pressed against the vibrating body itself. Furthermore, the piezoelectric elements 30 and 31 are attached to the surface of the panel 10 that faces the inside of the housing 60. Air-conducted sound and vibration sound can thus be transmitted to the user without projecting the vibrating body from the outer surface of the housing 60. Moreover, the panel 10 deforms not only in the region in which the piezoelectric elements 30 and 31 are attached, but rather throughout the panel 10 in order to transmit air-conducted sound and vibration sound. Therefore, in addition to hearing air-conducted sound through the air, the user can hear vibration sound by contacting the ear to any position on the panel 10.

Disposing the reinforcing member 80 between the piezoelectric element 30 and the panel 10 can further reduce the probability of an external force being transmitted to and damaging the piezoelectric elements 30 and 31 if, for example, such a force is applied to the panel 10. Moreover, even if the panel 10 is pressed firmly against a human body, vibration of the panel 10 does not dampen easily. By disposing the reinforcing member 80 between the piezoelectric element 30 and the panel 10, the resonance frequency of the panel 10 also decreases, thereby improving the acoustic characteristics in the low frequency band. Note that instead of the reinforcing member 80, a plate-shaped anchor may be attached to the piezoelectric element 30 by the joining member 70.

Figure 8:
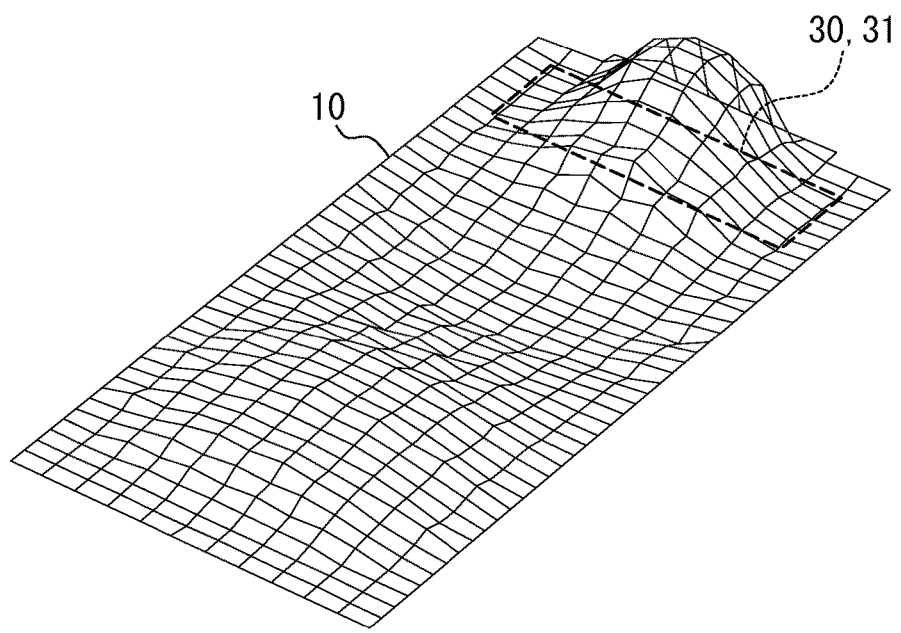
FIG. 8 illustrates an example of panel vibration in Embodiment 2.

FIG. 8 illustrates an example of vibration of the panel 10 in the electronic device 1 according to Embodiment 2. In the electronic device 1 according to Embodiment 2, the panel 10 is an acrylic plate with lower rigidity than a glass plate, and the display 20 is not adhered to the back face of the panel 10. Therefore, as compared to the electronic device 1 according to Embodiment 1, the amplitude produced by the piezoelectric elements is greater. Moreover, the panel 10 vibrates not only in the region in which the piezoelectric elements are attached, but also in a region separate from the attachment region. Therefore, in addition to hearing air-conducted sound through the air, the user can hear vibration sound by contacting the ear to any position on the panel 10.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various members may be reordered in any logically consistent way. Furthermore, components may be combined into one or divided.

Figure 9:
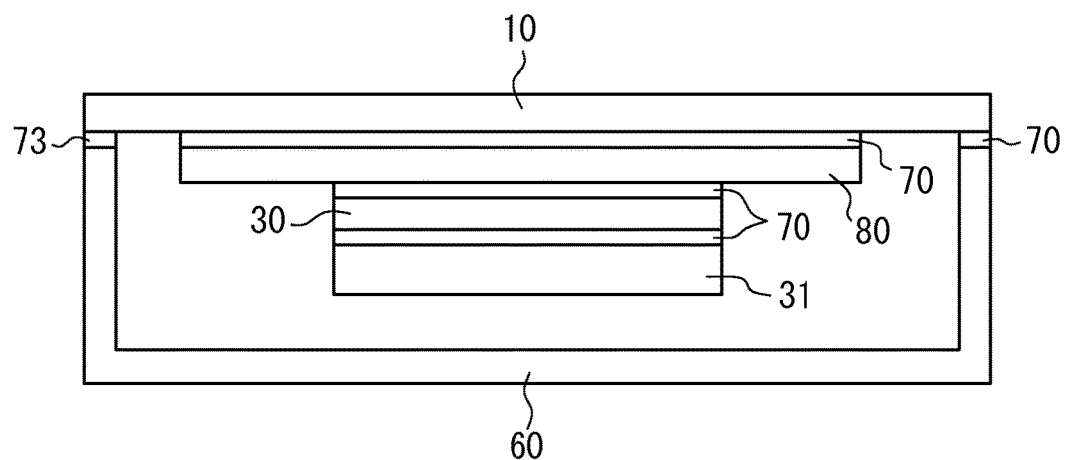
FIG. 9 illustrates an example of a panel support structure.

For example, as illustrated by the cross-section of the housing 60 in FIG. 9, the panel 10 may be adhered to the housing 60 by a joining member 73. Making it difficult for vibration to be transmitted directly from the panel 10 to the housing 60 in this way reduces the risk of the user dropping the electronic device 1 as compared to when the housing itself vibrates significantly. The joining member 73 may be a non-heat hardening adhesive. Such adhesive has the advantage that, during hardening, thermal stress contraction does not easily occur between the housing 60 and the panel 10. The joining member 73 may also be double-sided tape. Such tape has the advantage that the contraction stress when using adhesive is not easily produced between the housing 60 and the panel 10.

For example, when the panel 10 and the display 20 do not overlap, the piezoelectric elements 30 and 31 may be disposed at the center of the panel 10. When the piezoelectric elements 30 and 31 are disposed at the center of the panel 10, vibration of the piezoelectric elements 30 and 31 is transmitted uniformly across the entire panel 10, thereby improving the quality of air-conducted sound and permitting recognition of vibration sound when the user contacts the ear to any of various positions on the panel 10.

In Embodiments 1 and 2, the piezoelectric elements 30 and 31 are illustrated as examples, but the number of piezoelectric elements may be three or more. In this case, the piezoelectric element(s) for which the electric signal is controlled may be the piezoelectric element with the largest capacitance or a plurality of piezoelectric elements starting from the piezoelectric element with the largest capacitance.

By attaching the piezoelectric elements to any of a display panel, operation panel, cover panel, or lid panel that allows for removal of a rechargeable battery instead of attaching the piezoelectric elements to the panel 10, the member to which the piezoelectric elements are attached may be vibrated and caused to function as the vibration unit. When the panel 10 is a display panel, the piezoelectric elements 30 and 31 may be disposed on the outside of a display region fulfilling a display function. This offers the advantage of not blocking the display. The operation panel includes the touch panel of Embodiment 1. The operation panel also includes a sheet key, in which the tops of operation keys are integrally formed in, for example, a clamshell mobile phone so as to constitute one face of the housing at the operation interface side.

The type of joining members 70 to 73 used in Embodiment 1 and Embodiment 2 may be selected in accordance with the member to be adhered.

Figure 10:
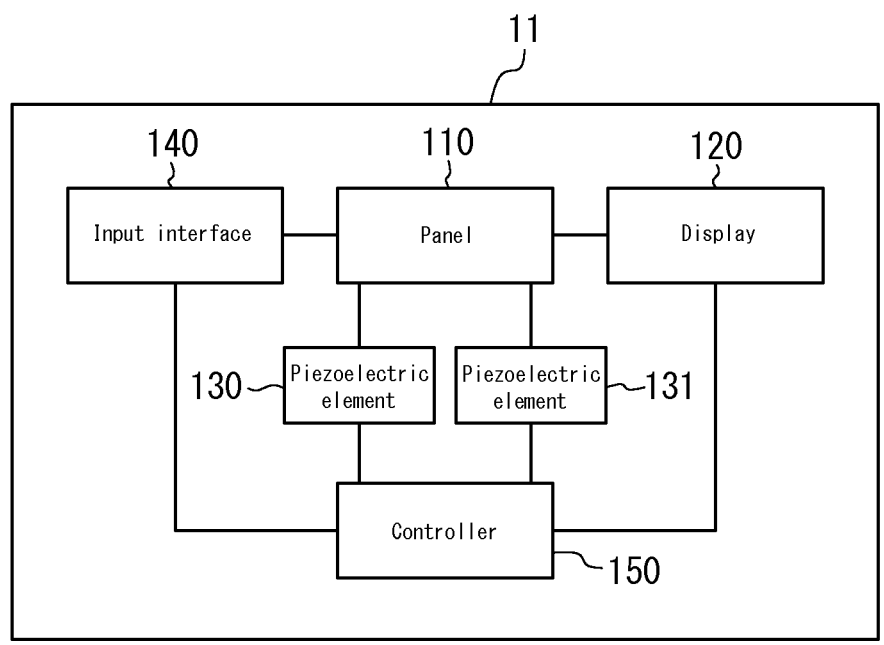
FIG. 10 is a functional block diagram of an electronic device.

FIG. 10 is a functional block diagram of an electronic device 11 according to another one of the disclosed embodiments. The electronic device 11 is, for example, a mobile phone (smartphone) and is provided with a panel 110, a display 120, piezoelectric elements 130 and 131, an input interface 140, and a controller 150.

The panel 110 is a touch panel that detects contact, a cover panel that protects the display 120, or the like. The panel 110 is, for example, made from glass or a synthetic resin such as acrylic or the like. The panel 110 is preferably plate-like in shape. The panel 110 may be a flat plate or may be a curved panel, the surface of which is smoothly inclined. When the panel 110 is a touch panel, the panel 110 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display 120 is a display device such as a liquid crystal display, an organic EL display, an inorganic EL display, or the like. The display 120 is provided on the back face of the panel 110. The display 120 is arranged on the back face of the panel 110. The display 120 may be adhered to the panel 110 by a joining member (for example, adhesive) or disposed at a distance from the panel 110 and supported by the housing of the electronic device 11.

The piezoelectric elements 130 and 131 are formed by elements that, upon application of an electric signal (voltage), either expand and contract or bend in accordance with the electromechanical coupling coefficient of their constituent material. Ceramic or crystal elements, for example, may be used. The piezoelectric elements 130 and 131 are, for example, unimorph elements or bimorph elements. Unimorph elements expand and contract upon the application of an electric signal (voltage), and bimorph elements bend upon the application of an electric signal (voltage). The piezoelectric elements 130 and 131 may be laminated piezoelectric elements. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers.

The piezoelectric elements 130 and 131 are disposed on the back face of the panel 110 (the face on the inner side of the electronic device 11). The first piezoelectric element 130 is, for example, attached to the panel 110 by a joining member (for example, double-sided tape). The piezoelectric element 130 may be attached to the panel 110 with an intermediate member (for example, sheet metal) therebetween. The second piezoelectric element 131 is stacked on and attached to the first piezoelectric element 130. The piezoelectric element 131 is, for example, attached to the piezoelectric element 130 by a joining member (for example, double-sided tape).

The input interface 140 accepts operation input from the user and may be configured, for example, using operation buttons (operation keys). Note that when the panel 110 is a touch panel, the panel 110 can also accept operation input from the user by detecting contact by the user.

The controller 150 is a processor that controls the electronic device 11. The controller 150 applies a predetermined electric signal (a voltage corresponding to an audio signal) to the piezoelectric elements 130 and 131. The voltage that the controller 150 applies to the piezoelectric elements 130 and 131 may, for example, be ±15 V. This is higher than ±5 V, i.e. the applied voltage of a so-called panel speaker for conduction of sound by air-conducted sound rather than vibration sound. In this way, even if the user contacts or presses (pushes) the panel 110 against the user's body with a force of 3 N or greater (for example, a force of 5 N to 10 N), sufficient vibration is generated in the panel 110, so that by vibrating a part of the user's body, i.e. a contacting part or a pressing part, a vibration sound can be generated via that part. Note that the magnitude of the applied voltage used may be appropriately adjusted in accordance with the fixation strength of the panel 110 with respect to the housing or a support member, or in accordance with the performance of the piezoelectric element 130.

Upon the controller 150 applying the electric signal to the piezoelectric elements 130 and 131, the piezoelectric elements 130 and 131 expand and contract or bend in accordance with the amplitude and period of the applied electric signal. At this point, the panel 110 to which the piezoelectric elements 130 and 131 are attached deforms in conjunction with the expansion and contraction or bending of the piezoelectric elements 130 and 131. The panel 110 thus vibrates. The panel 110 flexes due to expansion and contraction or to bending of the piezoelectric elements 130 and 131. The panel 110 is bent directly by the piezoelectric elements 130 and 131. Stating that "the panel 110 is bent directly by the piezoelectric elements" differs from the phenomenon utilized in known panel speakers, whereby the panel deforms upon vibration of a certain region of the panel due to the inertial force of a piezoelectric actuator constituted by a piezoelectric element disposed in the casing. Stating that "the panel 110 is bent directly by the piezoelectric elements" refers instead to how expansion and contraction or bending (flexure) of the piezoelectric elements directly bends the panel via the joining member or via the joining member and the below-described reinforcing member 180. Therefore, along with generating air-conducted sound, the panel 110 generates vibration sound via a part of the user's body when the user brings a part of the body (such as the cartilage of the outer ear) into contact. The controller 150 can apply an electric signal, corresponding to an audio signal related to the other party's voice, to the piezoelectric elements 130 and 131 to generate air-conducted sound and vibration sound that correspond to the audio signal. The audio signal may be related to ringtones, music including songs, or the like. Note that the audio signal pertaining to the electric signal may be based on music data stored in internal memory of the electronic device 11, or may be music data stored on an external server or the like and played back over a network.

The panel 110 is rectangular, for example, and vibrates not only in the region in which the piezoelectric elements 130 and 131 are attached, but also in a region separate from the attachment region. In the region of vibration, the panel 110 includes a plurality of locations at which the panel 110 vibrates in a direction intersecting the main surface of the panel 110. At each of these locations, the value of the vibration amplitude changes over time from positive to negative or vice-versa. At a given instant during vibration of the panel 110, portions with a relatively large vibration amplitude and portions with a relatively small vibration amplitude appear to be distributed randomly over nearly the entire panel 110. In other words, a plurality of vibration waves are detected across the entire panel 110. The voltage that the controller 150 applies to the piezoelectric elements 130 and 131 may be ±15 V to prevent damping of the above-described vibration of the panel 110 even if the user presses the panel 110 against the user's body with a force of, for example, 5 N to 10 N. Therefore, the user can hear sound by contacting a region distant from the above-described attachment region of the panel 110 to the ear.

Figure 11:
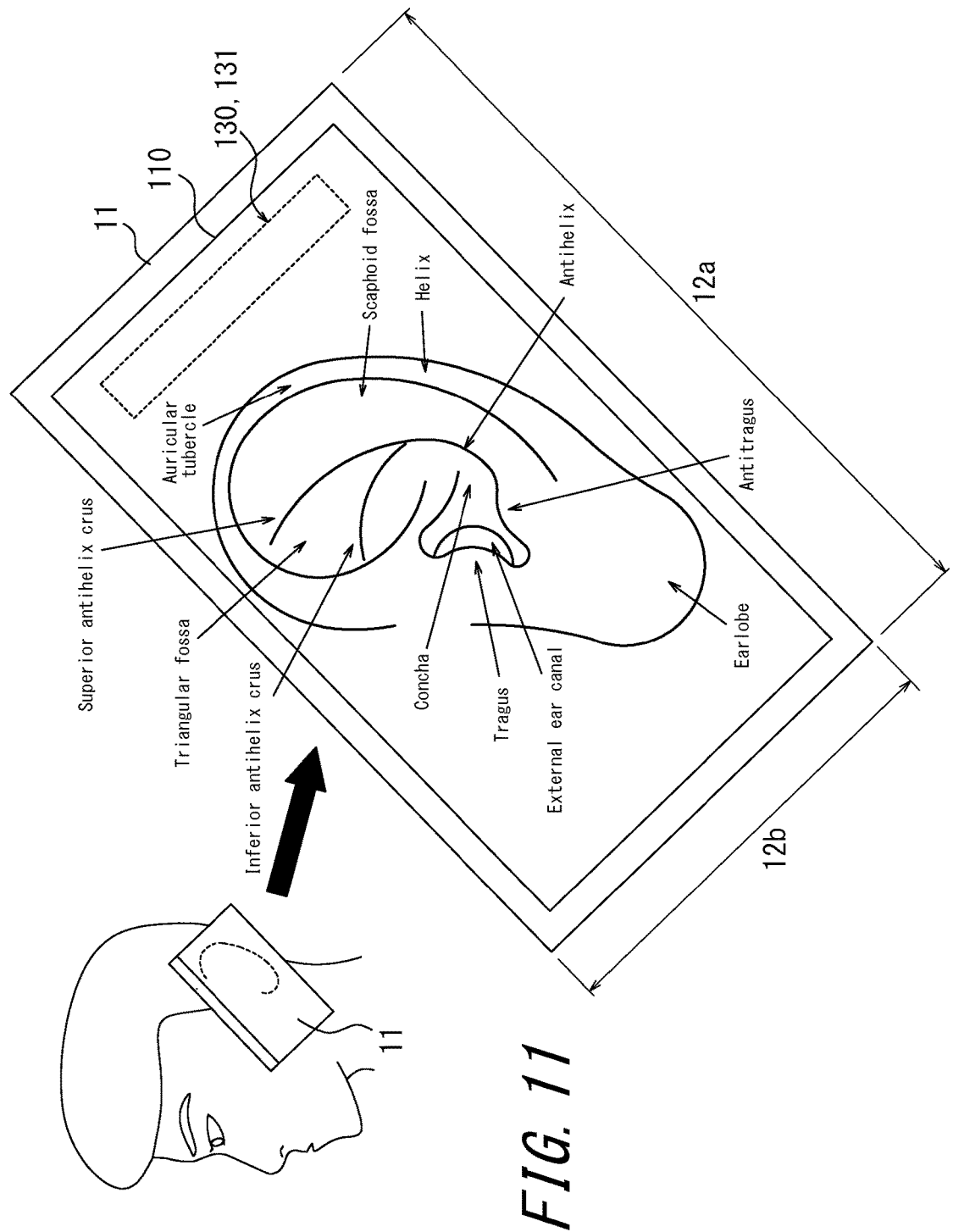
FIG. 11 illustrates an example of panel shape and size.

FIG. 11 illustrates an example of the shape and size of the panel 110. The panel 110 may be nearly the same size as the user's ear. As illustrated in FIG. 11, the panel 110 may also be larger than the user's ear. Adopting such a size makes it easier for the panel 110 of the electronic device 11 to cover the entire ear when the user listens to sound, thus making it difficult for surrounding sounds (noise) to enter the external ear canal. The region of the panel 110 that vibrates may be larger than a region having a length corresponding to the distance from the inferior antihelix crus to the antitragus and a width corresponding to the distance from the tragus to the antihelix. The region of the panel 110 that vibrates preferably has a length corresponding to the distance from a position in the helix near the superior antihelix crus to the earlobe and a width corresponding to the distance from the tragus to a position in the helix near the antihelix.

In this example, the direction of length is a longitudinal direction 12a in which the panel 110 extends. Along this direction, the piezoelectric elements 130 and 131 are disposed toward one end from the center of the panel 110. The direction of width is a direction 12b orthogonal to the longitudinal direction. The region with such a length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 110 is at least as large as the average size of a Japanese person's ear, it is thought that the panel 110 will be a size capable of covering the entire ear of most non-Japanese people. By including a region with the above-described dimensions and shape, the panel 110 can cover the user's ear and has tolerance for misalignment when placed against the ear. This region includes at least the region from the lower edge of the piezoelectric elements 130 and 131 to the midpoint of the panel 110 in the longitudinal direction 12a.

By vibration of the panel 110, the electronic device 11 can transmit vibration sound transmitted through a part of the user's body (such as the cartilage of the outer ear) and air-conducted sound to the user. In this example, the panel 110 is the vibration unit. Therefore, when sound is output at a volume equivalent to a known dynamic receiver, the sound that is transmitted to the periphery of the electronic device 11 by air vibrations due to vibration of the panel 110 is smaller than with a dynamic receiver. Accordingly, the electronic device 11 is appropriate for listening to recorded messages, for example, on the train or the like.

The electronic device 11 transmits vibration sound by vibration of the panel 110, and therefore even if the user is wearing earphones or headphones, for example, the user can hear sound through the earphones or headphones and through a part of the body by contacting the electronic device 11 against the earphones or headphones.

The electronic device 11 transmits sound to a user by vibration of the panel 110. Therefore, if the electronic device 11 is not provided with a separate dynamic receiver, it is unnecessary to form an opening (sound discharge port) for sound transmission in the housing, thereby simplifying waterproof construction of the electronic device 11. On the other hand, if the electronic device 11 is provided with a dynamic receiver, the sound discharge port may be blocked by a member permeable by gas but not liquid. Gore-Tex (registered trademark) is an example of a member permeable by gas but not liquid.

Embodiment 3

Figure 12A:
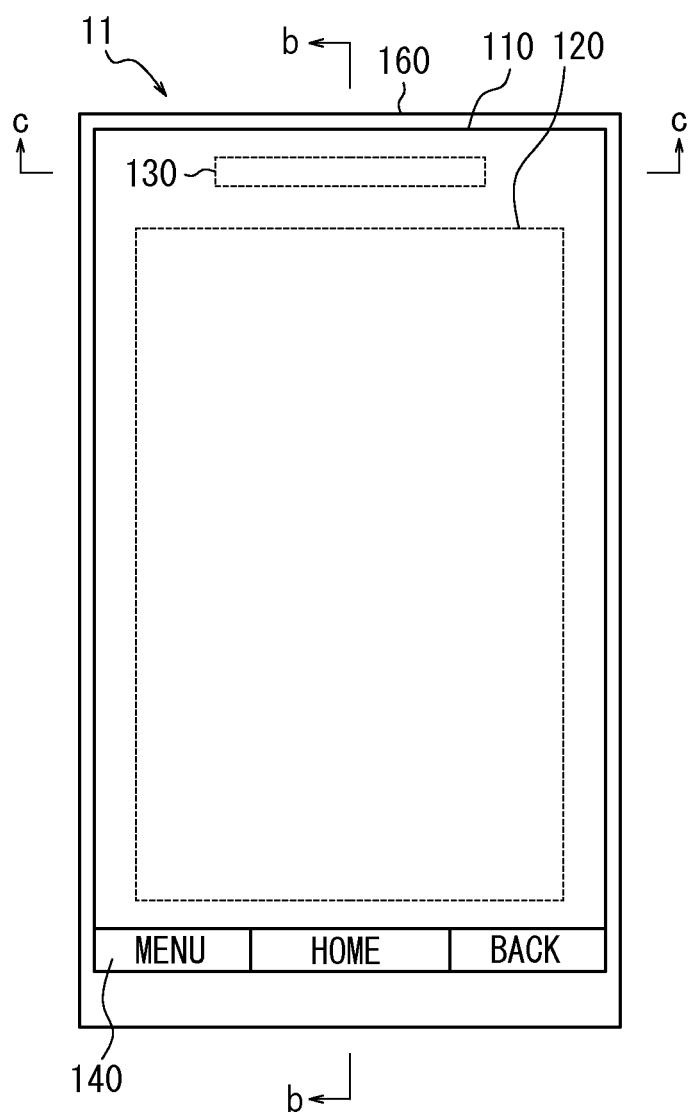
FIGS. 12A, 12B, and 12C illustrate a housing structure of an electronic device according to Embodiment 3.
Figure 12B:
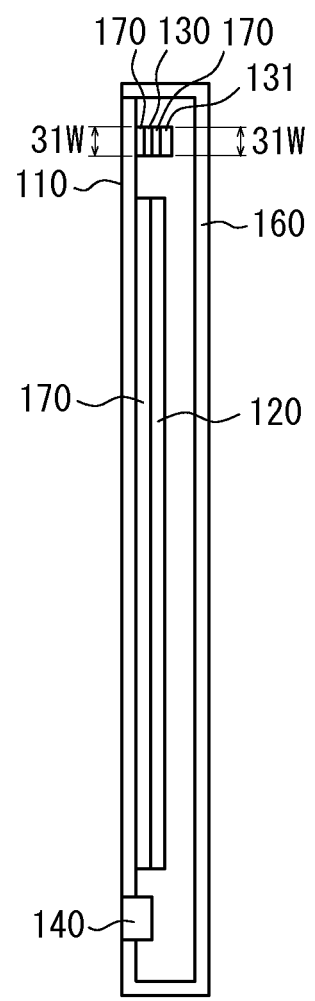
Figure 12C:
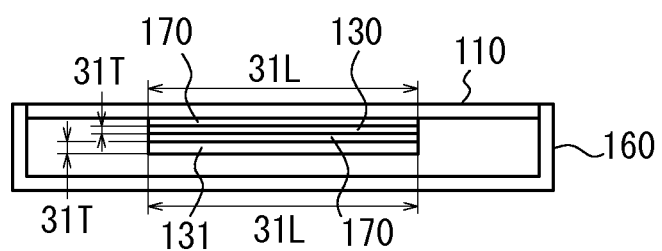

FIGS. 12A, 12B, and 12C illustrate a housing structure of the electronic device 11 according to Embodiment 3. FIG. 12A is a front view, FIG. 12B is a cross-sectional view along the b-b line of FIG. 12A, and FIG. 12C is a cross-sectional view along the c-c line of FIG. 12A. The electronic device 11 illustrated in FIGS. 12A to 12C is a smartphone in which a touch panel that is a glass plate is disposed on the front face of a housing 160 (for example a metal or resin case) as the panel 110.

The panel 110 and the input interface 140 are supported by the housing 160, and the display 120 and piezoelectric elements 130 and 131 are each attached to the panel 110. The panel 110, display 120, and piezoelectric element 130 are each generally rectangular.

The display 120 is disposed in approximately the center in the transverse direction of the panel 110 and is attached to the panel 110 by a joining member 171. The joining member 171 may be adhesive with thermosetting properties, ultraviolet curable properties, or other such properties and may, for example, be optical elasticity resin, which is clear and colorless acrylic ultraviolet curing adhesive. The display 120 is preferably adhered to the panel 110 over the entire surface in contact with the panel 110. The rigidity of a vibrating plate 1100 can thus be increased in a portion where the display 120 is adhered to the panel 110.

The piezoelectric elements 130 and 131 are disposed at a predetermined distance from an edge of the panel 110 in the longitudinal direction, near the edge so that the longitudinal direction of the piezoelectric elements 130 and 131 is aligned with the short sides of the panel 110. The display 120 and the piezoelectric elements 130 and 131 are disposed side by side, in parallel directions, on the inner face of the panel 110.

The piezoelectric elements 130 and 131 are stacked on and attached to the panel 110. For example, the first piezoelectric element 130 may be adhered to the panel 110 by a joining member 170. The second piezoelectric element 131 may also be stacked on and adhered to the first piezoelectric element 130 by the joining member 170. The joining member 170 is adhesive with thermosetting properties, ultraviolet curable properties, or other such properties; double-sided tape; or the like. The joining member 170 may, for example, be optical elasticity resin, which is clear and colorless acrylic ultraviolet curing adhesive. By using double-sided tape that has elasticity, a degree of freedom of deformation of each of the piezoelectric elements 130 and 131 can be guaranteed while making it difficult for the piezoelectric elements 130 and 131 to detach from the joining member due to deformation of the joining member caused by deformation of both of the piezoelectric elements 130 and 131. Alternatively, adhesive with thermosetting properties, ultraviolet curable properties, or other such properties may be used as the joining member 170. As a result, the piezoelectric elements 130 and 131 can be adhered in a state such that thermal stress contraction does not easily occur between the piezoelectric element 130 and the panel 110 or between the piezoelectric elements 130 and 131. Furthermore, the joining member 170 used between the piezoelectric element 130 and the panel 110 and the joining member 170 used between the piezoelectric elements 130 and 131 may be formed from different types of material.

The piezoelectric elements 130 and 131 are separated from the inner surface of the housing 160 by a predetermined distance. The piezoelectric elements 130 and 131 are preferably separated from the inner surface of the housing 160 by the predetermined distance even when expanding and contracting or bending. In other words, the distance between the piezoelectric elements 130 and 131 and the inner face of the housing 160 is preferably larger than the maximum amount of deformation of the piezoelectric elements 130 and 131.

In Embodiment 3, the piezoelectric elements 130 and 131 have different resonance frequencies. For example, the piezoelectric elements 130 and 131 may be provided with different resonance frequencies by at least one of the following dimensions of the piezoelectric elements 130 and 131 differing: the lengths 30L and 31L in the longitudinal direction, the widths 30W and 31W in a direction intersecting the longitudinal direction, and the thicknesses 30T and 31T in the stacking direction. Furthermore, when the piezoelectric elements 130 and 131 are configured with laminated unimorph or bimorph elements, the overall thicknesses 30T and 31T of the elements may be caused to differ by varying the thickness of each layer when the piezoelectric elements have the same number of layers or by varying the number of layers when each layer has the same thickness. As a result, the resonance frequencies can be caused to differ. Alternatively, the resonance frequencies may be caused to differ by forming the piezoelectric elements 130 and 131 from different materials. As the respective thicknesses 30T and 31T of the piezoelectric elements 130 and 131 are increased, a higher resonance frequency is obtained. Furthermore, as the material is harder, a higher resonance frequency is obtained.

Figure 13A:
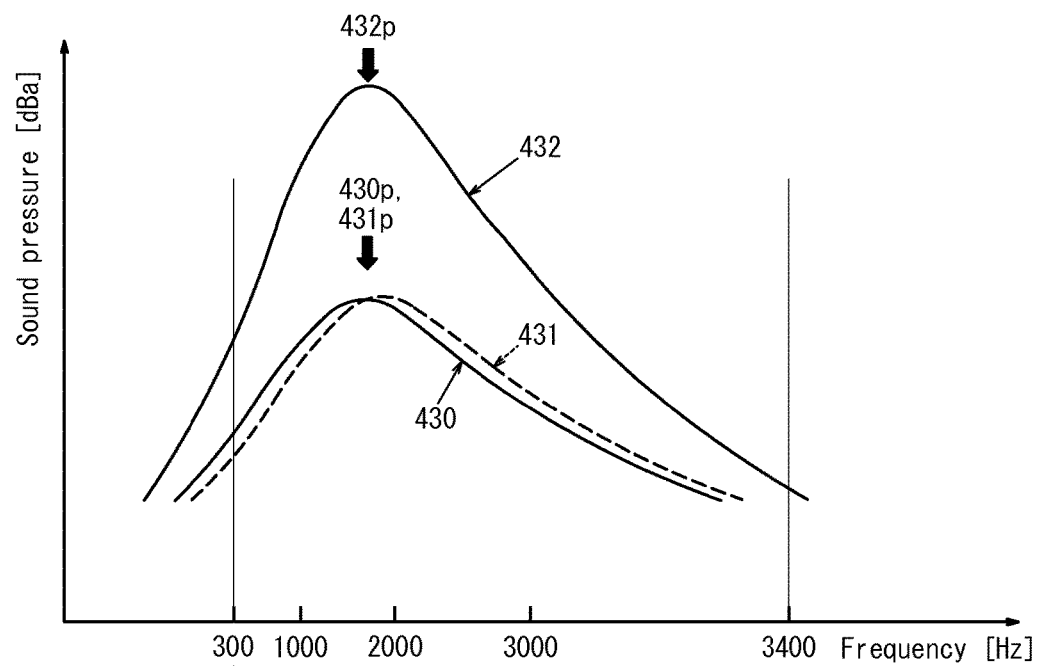
FIGS. 13A and 13B illustrate the frequency characteristics of piezoelectric elements.
Figure 13B:
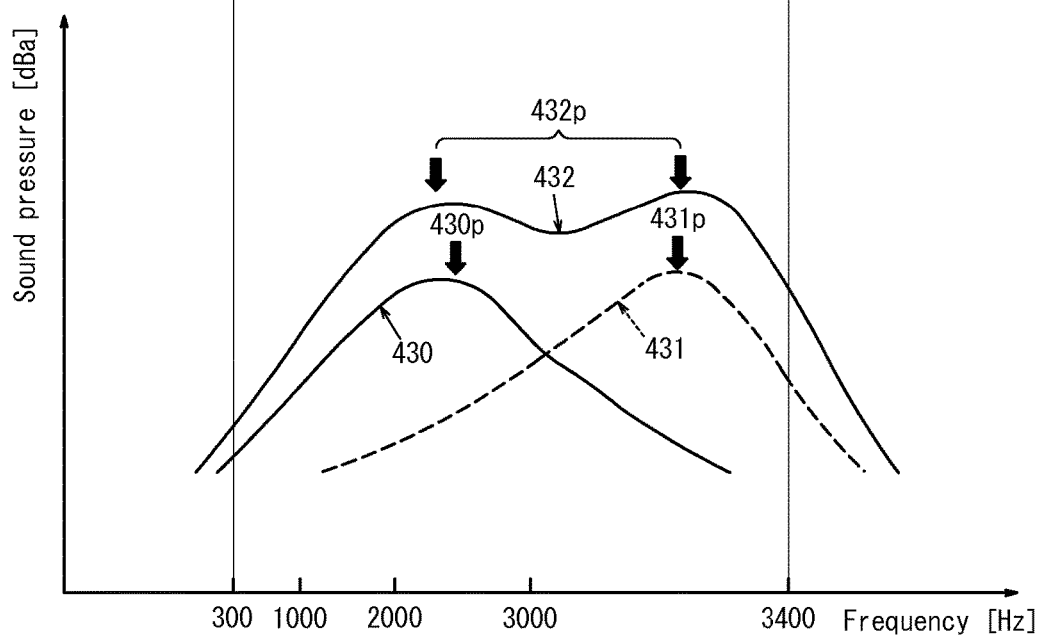

FIGS. 13A and 13B illustrate the resonance frequency of the piezoelectric elements 130 and 131. With the horizontal axis representing the frequency of the output audio and the vertical axis representing sound pressure, FIGS. 13A and 13B schematically illustrate sound pressure frequency characteristics 430 and 431 in the case that the panel 110 is vibrated separately by each of the piezoelectric elements 130 and 131 and a sound pressure frequency characteristic 432 in the case that the panel 110 is vibrated by the piezoelectric elements 130 and 131 in cooperation. As a comparative example with respect to Embodiment 3, FIG. 13A illustrates the case of the sound pressure frequency characteristics 430 and 431 being identical or approximately identical and of the resonance frequencies 430$p$ and 431$p$ of the piezoelectric elements 130 and 131 matching or nearly matching. In this case, the resonance frequency 432$p$ is either singular or is concentrated in a narrow band. By contrast, FIG. 13B illustrates the case in Embodiment 3 in which the sound pressure frequency characteristics 430 and 431 differ, so that the resonance frequencies 430$p$ and 431$p$ of the piezoelectric elements 130 and 131 diverge. In FIG. 13B, the resonance frequency 432$p$ spreads over a relatively wide band in accordance with the difference between the resonance frequencies 430$p$ and 431$p$.

In Embodiment 3 (FIG. 13B), the resonance frequency 432$p$ when the piezoelectric elements 130 and 131 vibrate the panel in cooperation is spread out as a result of the resonance frequencies 430$p$ and 431$p$ of the piezoelectric elements 130 and 131 differing. Therefore, a high sound pressure can be obtained stably over a wider band (for example, the band of 300 Hz to 3400 Hz used in voice calls) than when the resonance frequencies 430$p$ and 431$p$ match (FIG. 13A). Furthermore, when calibrating with, for example, a band-pass filter to correct for the error in the resonance frequency 432$p$ of each electronic device 11 (smartphone), the case of the resonance frequency 432$p$ being spread out over a relatively wide band and the sound pressure being stable as in FIG. 13B offers the advantage of easier control than when the resonance frequency 432$p$ is singular or is concentrated in a narrow band as in FIG. 13A. To obtain this advantage, the difference between the resonance frequencies 430$p$ and 431$p$ of the piezoelectric elements 130 and 131 is preferably greater than the individual error range in the specifications of each of the piezoelectric elements 130 and 131.

In this way, stating that the "piezoelectric elements each have a different resonance frequency" in this disclosure does not refer to the individual error of each of the piezoelectric elements 130 and 131 illustrated in FIG. 13A (variation in performance or in specifications), but rather means that the resonance frequencies of the piezoelectric elements 130 and 131 are caused to differ on purpose to a greater degree than the individual error that is required or assumed for the piezoelectric elements as manufactured products. The resonance frequency that includes individual error is within the range of f0±fc, where f0 is the standard frequency, and fc is the maximum individual error that is required or assumed for the piezoelectric element as a manufactured product. For example, when comparing a combination of piezoelectric elements 130 and 131 with resonance frequencies of (f0, f0) and a combination of piezoelectric elements 130 and 131 with resonance frequencies of (f0+fc, f0+fc), the difference in resonance frequency characteristics between these two combinations grows large. By contrast, in this embodiment, the resonance frequencies of the piezoelectric elements 130 and 131 are caused to differ on purpose to a greater degree than the individual error that is required or assumed for the piezoelectric elements as manufactured products. This offers the advantage that the difference in resonance frequency characteristics between various combinations of different piezoelectric elements 130 and 131 does not become large.

Similarly, stating that "the piezoelectric elements each have a different shape", "each piezoelectric element has at least one side with a different length", and "the piezoelectric elements are laminated piezoelectric elements each having a different number of layers" in this disclosure also does not refer to individual error in the dimensions of the piezoelectric elements but rather means that the dimensions are caused to differ on purpose to a greater degree than the error in dimensions that is required or assumed for the piezoelectric elements as manufactured products.

Figure 14:
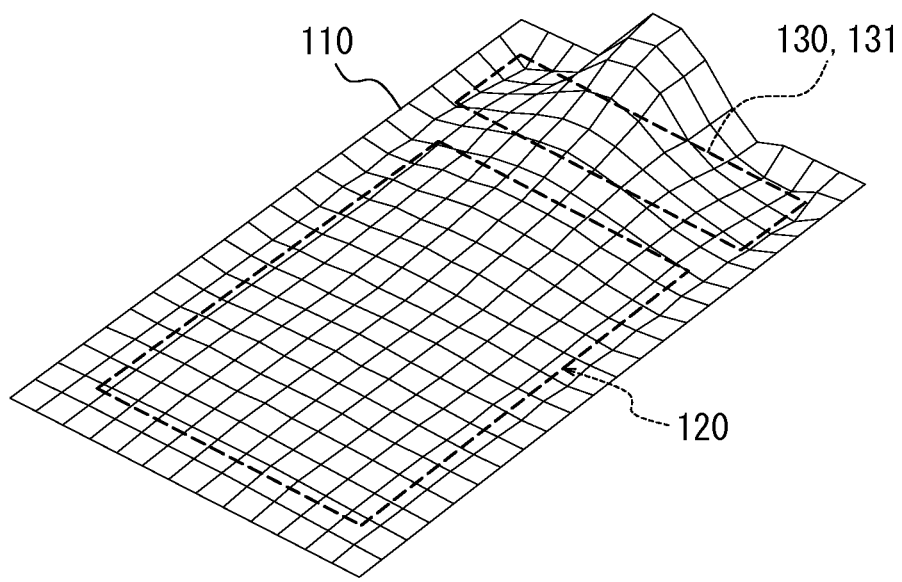
FIG. 14 illustrates an example of panel vibration in Embodiment 3.

FIG. 14 illustrates an example of vibration of the panel 110 in the electronic device 11 according to Embodiment 3. In the electronic device 11 according to Embodiment 3, the display 120 is attached to the panel 110. Therefore, it is more difficult for the lower part of the panel 110 to vibrate as compared to the upper part of the panel 110 where the piezoelectric elements 130 and 131 are attached. As a result, at the lower part of the panel 110, sound leakage due to vibration of the lower part of the panel 110 is reduced. The upper part of the panel 110 is bent directly by the piezoelectric elements 130 and 131, and hence vibration is damped at the lower part as compared to the upper part. In the direction of the long sides of the piezoelectric elements 130 and 131, the portion of the panel 110 immediately above the piezoelectric elements 130 and 131 rises the highest as compared to adjacent portions.

In the electronic device 11 according to Embodiment 3, the panel 110 thus deforms in conjunction with deformation of the piezoelectric elements 130 and 131 attached to the back face of the panel 110, so that air-conducted sound and vibration sound can be transmitted to an object that contacts the deforming panel 110. As a result, air-conducted sound and vibration sound can be transmitted to the user without projecting the vibration unit from the outer surface of the housing 160, thereby improving usability over the electronic device disclosed in PTL 1, in which a vibrating body extremely small as compared to the housing is pressed against a human body. The piezoelectric elements also do not damage easily, since the user's ear need not be pressed against the piezoelectric elements themselves. Moreover, causing the housing 160 rather than the panel 110 to deform makes it easier for the user to drop the terminal when vibration is generated, whereas vibrating the panel 110 makes such dropping of the terminal unlikely.

Embodiment 4

Figure 15A:
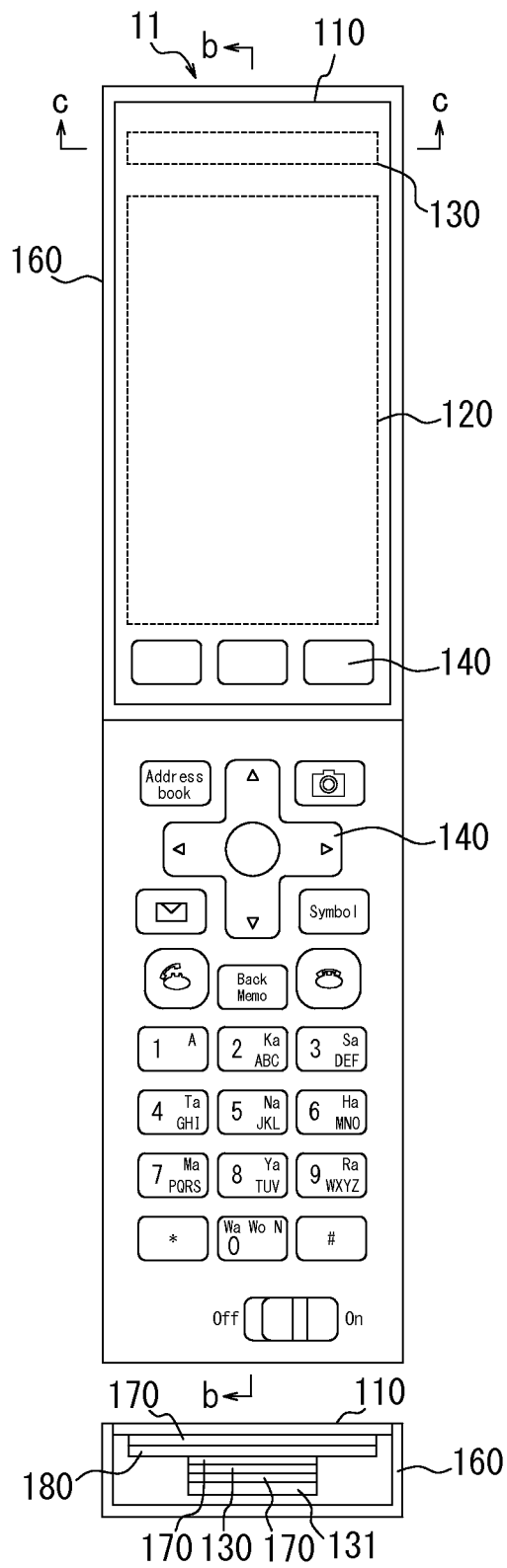
FIGS. 15A, 15B, and 15C illustrate a housing structure of an electronic device according to Embodiment 4.
Figure 15B:
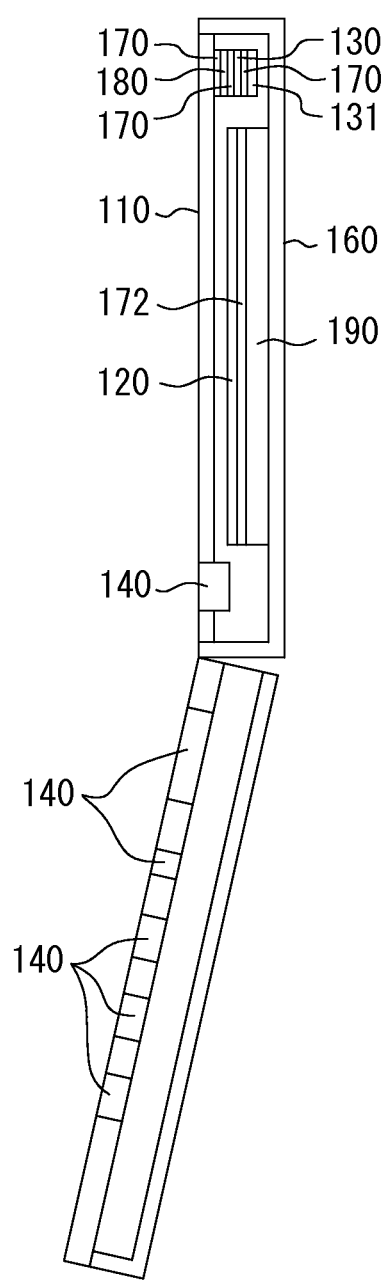
Figure 15C:
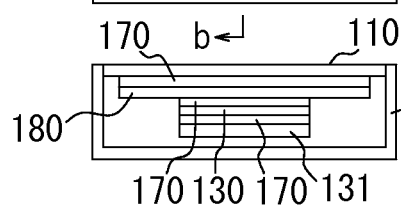

FIGS. 15A, 15B, and 15C illustrate a housing structure of the electronic device 11 according to Embodiment 4. FIG. 15A is a front view, FIG. 15B is a cross-sectional view along the b-b line of FIG. 15A, and FIG. 15C is a cross-sectional view along the c-c line of FIG. 15A. The electronic device 11 illustrated in FIGS. 15A to 15C is a clamshell mobile phone in which a cover panel (an acrylic plate) protecting the display 120 is disposed on the front face at the upper side of the housing 160 as the panel 110.

In Embodiment 4, a reinforcing member 180 is disposed between the panel 110 and the piezoelectric element 130. The reinforcing member 180 is, for example, an elastic member such as rubber, silicone, or the like. The reinforcing member 180 may, for example, be a metal plate formed from aluminum or the like and having a certain degree of elasticity. The reinforcing member 180 may also, for example, be a resin plate. Examples of the resin used to form such a resin plate include a polyamide resin. Examples of a polyamide resin include Reny (registered trademark), which is formed from crystalline thermoplastic resin obtained from m-Xylylenediamine and adipic acid and has excellent strength and elasticity. Such a polyamide resin may be used as a base polymer and reinforced by glass fiber, metallic fiber, carbon fiber, or the like to yield a reinforced resin. The strength and elasticity may be appropriately adjusted in accordance with the amount of glass fiber, metallic fiber, carbon fiber, or the like added to the polyamide resin. The above-described reinforced resin may, for example, be formed by interweaving glass fiber, metallic fiber, carbon fiber, or the like into a substrate, impregnating the substrate with resin, and allowing the resin to harden. The reinforced resin may be formed by mixing finely cut fibers into liquid resin and then allowing the resin to harden. The reinforced resin may also be a laminate of a substrate with interwoven fiber and a resin layer.

The piezoelectric elements 130 and 131 are stacked on and attached to the panel 110. For example, the second piezoelectric element 131 and the third piezoelectric element 130 may be adhered by the joining member 170, the third piezoelectric element 130 and the reinforcing member 180 may be adhered by the joining member 170, and the reinforcing member 180 and the panel 110 may be adhered by the joining member 170. The joining member 170 is adhesive with thermosetting properties, ultraviolet curable properties, or other such properties; double-sided tape; or the like. The piezoelectric elements 130 and 131 are disposed at a predetermined distance from an edge of the panel 110 in the longitudinal direction, near the edge so that the longitudinal direction of the piezoelectric elements 130 and 131 is aligned with the short sides of the panel 110.

In Embodiment 4 as well, the piezoelectric elements 130 and 131 have different resonance frequencies. As in Embodiment 3, a high sound pressure is thus obtained over a relatively wide band when the piezoelectric elements 130 and 131 cooperate and vibrate the panel 110. Calibration to correct for individual error of the electronic device 11 (mobile phone) can also be accomplished more easily.

In Embodiment 4, the display 120 is supported by the housing 160. In other words, in the electronic device 11 according to Embodiment 4, the display 120 is adhered to a support 190, which is a portion of the housing 160, by a joining member 172. The support 190 is not limited to being a portion of the housing 160 and may be configured using metal, resin, or the like to be a member independent from the housing 160.

In the electronic device 11 according to Embodiment 4, the reinforcing member 180 and the panel 110 deform in conjunction with deformation of the piezoelectric elements 130 and 131 attached to the panel 110 via the reinforcing member 180, so that air-conducted sound and vibration sound are transmitted to an object that contacts the deforming panel 110. As a result, air-conducted sound and vibration sound can be transmitted to the user without the user's ear being pressed against the vibrating body itself. Furthermore, the piezoelectric elements 130 and 131 are attached to the surface of the panel 110 that faces the inside of the housing 160. Air-conducted sound and vibration sound can thus be transmitted to the user without projecting the vibrating body from the outer surface of the housing 160. Moreover, the panel 110 deforms not only in the region in which the piezoelectric elements 130 and 131 are attached, but rather throughout the panel 110 in order to transmit air-conducted sound and vibration sound. Therefore, in addition to hearing air-conducted sound through the air, the user can hear vibration sound by contacting the ear to any position on the panel 110.

Disposing the reinforcing member 180 between the piezoelectric element 130 and the panel 110 can further reduce the probability of an external force being transmitted to and damaging the piezoelectric elements 130 and 131 if, for example, such a force is applied to the panel 110. Moreover, even if the panel 110 is pressed firmly against a human body, vibration of the panel 110 does not dampen easily. By disposing the reinforcing member 180 between the piezoelectric element 130 and the panel 110, the resonance frequency of the panel 110 also decreases, thereby improving the acoustic characteristics in the low frequency band. Note that instead of the reinforcing member 180, a plate-shaped anchor may be attached to the piezoelectric element 130 by the joining member 170.

Figure 16:
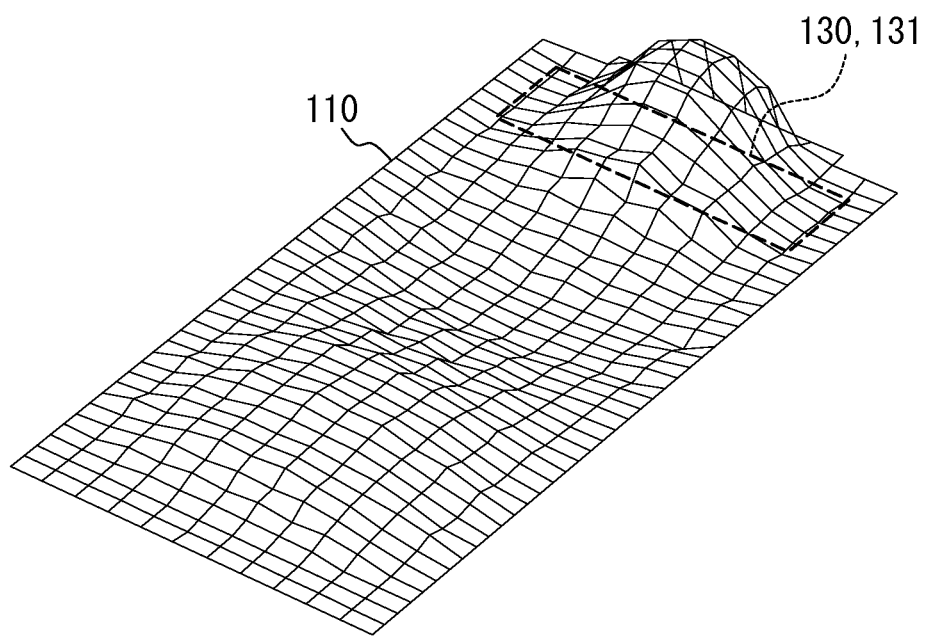
FIG. 16 illustrates an example of panel vibration in Embodiment 4.

FIG. 16 illustrates an example of vibration of the panel 110 in the electronic device 11 according to Embodiment 4. In the electronic device 11 according to Embodiment 4, the panel 110 is an acrylic plate with lower rigidity than a glass plate, and the display 120 is not adhered to the back face of the panel 110. Therefore, as compared to the electronic device 11 according to Embodiment 3, the amplitude produced by the piezoelectric elements is greater. Moreover, the panel 110 vibrates not only in the region in which the piezoelectric elements are attached, but also in a region separate from the attachment region. Therefore, in addition to hearing air-conducted sound through the air, the user can hear vibration sound by contacting the ear to any position on the panel 110.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various members may be reordered in any logically consistent way. Furthermore, components may be combined into one or divided.

Figure 17:
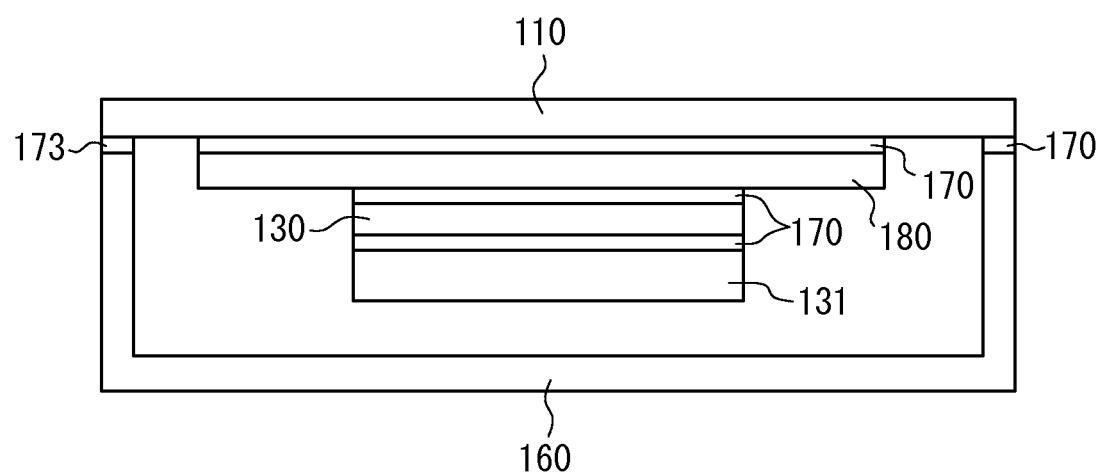
FIG. 17 illustrates an example of a panel support structure.

For example, as illustrated by the cross-section of the housing 160 in FIG. 17, the panel 110 may be adhered to the housing 160 by a joining member 173. Making it difficult for vibration to be transmitted directly from the panel 110 to the housing 160 in this way reduces the risk of the user dropping the electronic device 11 as compared to when the housing itself vibrates significantly. The joining member 173 may be a non-heat hardening adhesive. Such adhesive has the advantage that, during hardening, thermal stress contraction does not easily occur between the housing 160 and the panel 110. The joining member 173 may also be double-sided tape. Such tape has the advantage that the contraction stress when using adhesive is not easily produced between the housing 160 and the panel 110.

For example, when the panel 110 and the display 120 do not overlap, the piezoelectric elements 130 and 131 may be disposed at the center of the panel 110. When the piezoelectric elements 130 and 131 are disposed at the center of the panel 110, vibration of the piezoelectric elements 130 and 131 is transmitted uniformly across the entire panel 110, thereby improving the quality of air-conducted sound and permitting recognition of vibration sound when the user contacts the ear to any of various positions on the panel 110.

In Embodiments 3 and 4, the piezoelectric elements 130 and 131 are illustrated as examples, but the number of piezoelectric elements may be three or more. In this case, by causing the resonance frequencies of two or more piezoelectric elements to differ, the resonance points can be dispersed in accordance with the number of piezoelectric elements, thus obtaining a high sound pressure over a relatively wide band. Calibration to correct for individual error of the electronic device can also be accomplished more easily.

By attaching the piezoelectric elements to any of a display panel, operation panel, cover panel, or lid panel that allows for removal of a rechargeable battery instead of attaching the piezoelectric elements to the panel 110, the member to which the piezoelectric elements are attached may be vibrated and caused to function as the vibration unit. When the panel 110 is a display panel, the piezoelectric elements 130 and 131 may be disposed on the outside of a display region fulfilling a display function. This offers the advantage of not blocking the display. The operation panel includes the touch panel of Embodiment 3. The operation panel also includes a sheet key, in which the tops of operation keys are integrally formed in, for example, a clamshell mobile phone so as to constitute one face of the housing at the operation interface side.

The type of joining members 170 to 173 used in Embodiment 3 and Embodiment 4 may be selected in accordance with the member to be adhered.

Figure 18:
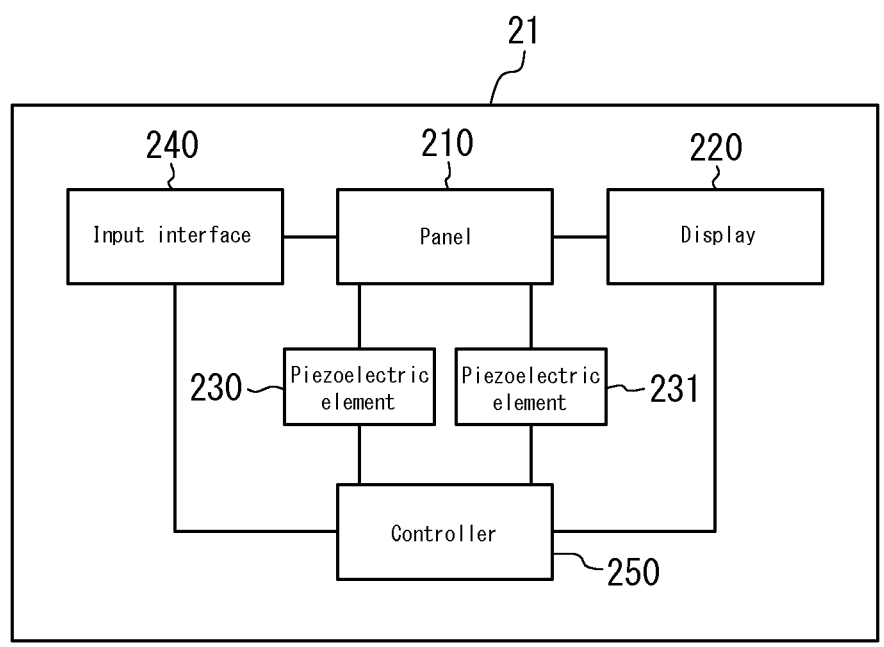
FIG. 18 is a functional block diagram of an electronic device.

FIG. 18 is a functional block diagram of an electronic device 21 according to another one of the disclosed embodiments. The electronic device 21 is, for example, a mobile phone (smartphone) and is provided with a panel 210, a display 220, piezoelectric elements 230 and 231, an input interface 240, and a controller 250.

The panel 210 is a touch panel that detects contact, a cover panel that protects the display 220, or the like. The panel 210 is, for example, made from glass or a synthetic resin such as acrylic or the like. The panel 210 is preferably plate-like in shape. The panel 210 may be a flat plate or may be a curved panel, the surface of which is smoothly inclined. When the panel 210 is a touch panel, the panel 210 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display 220 is a display device such as a liquid crystal display, an organic EL display, an inorganic EL display, or the like. The display 220 is provided on the back face of the panel 210. The display 220 is arranged on the back face of the panel 210. The display 220 may be adhered to the panel 210 by a joining member (for example, adhesive) or disposed at a distance from the panel 210 and supported by the housing of the electronic device 21.

The piezoelectric elements 230 and 231 are formed by elements that, upon application of an electric signal (voltage), either expand and contract or bend in accordance with the electromechanical coupling coefficient of their constituent material. Ceramic or crystal elements, for example, may be used. The piezoelectric elements 230 and 231 are laminated piezoelectric elements. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The piezoelectric elements 230 and 231 are disposed on the back face of the panel 210 (the face on the inner side of the electronic device 21). The first piezoelectric element 230 is, for example, attached to the panel 210 by a joining member (for example, double-sided tape). The piezoelectric element 230 may be attached to the panel 210 with an intermediate member (for example, sheet metal) therebetween. The second piezoelectric element 231 is stacked on and attached to the first piezoelectric element 230. The piezoelectric element 231 is, for example, attached to the piezoelectric element 230 by a joining member (for example, double-sided tape).

The input interface 240 accepts operation input from the user and may be configured, for example, using operation buttons (operation keys). Note that when the panel 210 is a touch panel, the panel 210 can also accept operation input from the user by detecting contact by the user.

The controller 250 is a processor that controls the electronic device 21. The controller 250 applies a predetermined electric signal (a voltage corresponding to an audio signal) to the piezoelectric elements 230 and 231. The voltage that the controller 250 applies to the piezoelectric elements 230 and 231 may, for example, be ±15 V. This is higher than ±5 V, i.e. the applied voltage of a so-called panel speaker for conduction of sound by air-conducted sound rather than vibration sound. In this way, even if the user contacts or presses (pushes) the panel 10 against the user's body with a force of 3 N or greater (for example, a force of 5 N to 10 N), sufficient vibration is generated in the panel 210, so that by vibrating a part of the user's body, i.e. a contacting part or a pressing part, a vibration sound can be generated via that part. Note that the magnitude of the applied voltage used may be appropriately adjusted in accordance with the fixation strength of the panel 210 with respect to the housing or a support member, or in accordance with the performance of the piezoelectric element 230.

Upon the controller 250 applying the electric signal to the piezoelectric elements 230 and 231, the piezoelectric elements 230 and 231 expand and contract or bend. At this point, the panel 210 to which the piezoelectric elements 230 and 231 are attached deforms in conjunction with the expansion and contraction or bending of the piezoelectric elements 230 and 231. The panel 210 thus vibrates. The panel 210 flexes due to expansion and contraction or to bending of the piezoelectric elements 230 and 231. The panel 210 is bent directly by the piezoelectric elements 230 and 231. Stating that "the panel 210 is bent directly by the piezoelectric elements" differs from the phenomenon utilized in known panel speakers, whereby the panel deforms upon vibration of a certain region of the panel due to the inertial force of a piezoelectric actuator constituted by a piezoelectric element disposed in the casing. Stating that "the panel 210 is bent directly by the piezoelectric elements" refers instead to how expansion and contraction or bending (flexure) of the piezoelectric elements directly bends the panel via the joining member or via the joining member and the below-described reinforcing member 280. Therefore, along with generating air-conducted sound, the panel 210 generates vibration sound via a part of the user's body when the user brings a part of the body (such as the cartilage of the outer ear) into contact. The controller 250 can apply an electric signal, corresponding to an audio signal related to the other party's voice, to the piezoelectric elements 230 and 231 to generate air-conducted sound and vibration sound that correspond to the audio signal. The audio signal may be related to ringtones, music including songs, or the like. Note that the audio signal pertaining to the electric signal may be based on music data stored in internal memory of the electronic device 21, or may be music data stored on an external server or the like and played back over a network.

The panel 210 is rectangular, for example, and vibrates not only in the region in which the piezoelectric elements 230 and 231 are attached, but also in a region separate from the attachment region. In the region of vibration, the panel 210 includes a plurality of locations at which the panel 210 vibrates in a direction intersecting the main surface of the panel 210. At each of these locations, the value of the vibration amplitude changes over time from positive to negative or vice-versa. At a given instant during vibration of the panel 210, portions with a relatively large vibration amplitude and portions with a relatively small vibration amplitude appear to be distributed randomly over nearly the entire panel 210. In other words, a plurality of vibration waves are detected across the entire panel 210. The voltage that the controller 250 applies to the piezoelectric elements 230 and 231 may be ±15 V to prevent damping of the above-described vibration of the panel 210 even if the user presses the panel 210 against the user's body with a force of, for example, 5 N to 10 N. Therefore, the user can hear sound by contacting a region distant from the above-described attachment region of the panel 210 to the ear.

Figure 19:
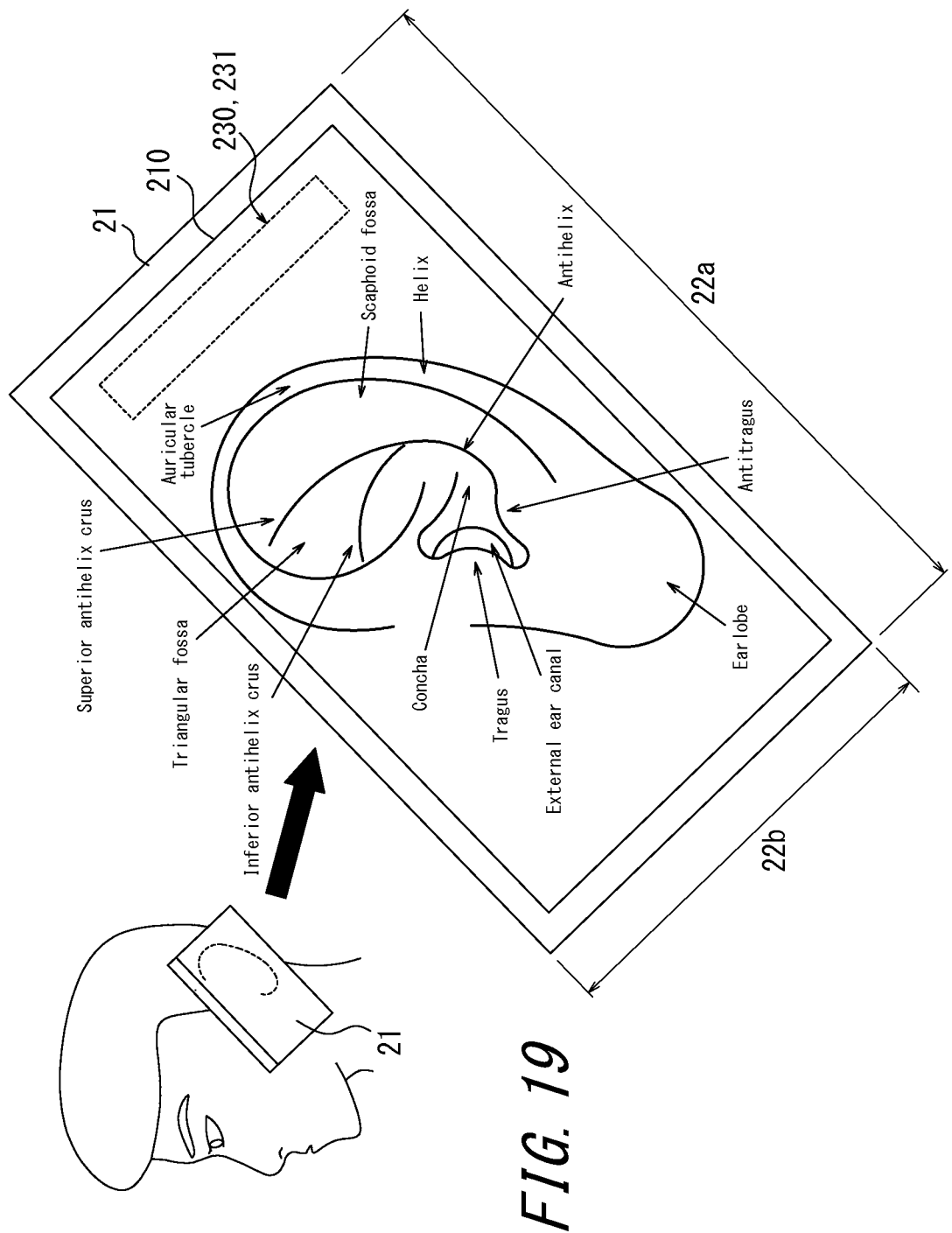
FIG. 19 illustrates an example of panel shape and size.

FIG. 19 illustrates an example of the shape and size of the panel 210. The panel 210 may be nearly the same size as the user's ear. As illustrated in FIG. 19, the panel 210 may also be larger than the user's ear. Adopting such a size makes it easier for the panel 210 of the electronic device 21 to cover the entire ear when the user listens to sound, thus making it difficult for surrounding sounds (noise) to enter the external ear canal. The region of the panel 210 that vibrates may be larger than a region having a length corresponding to the distance from the inferior antihelix crus to the antitragus and a width corresponding to the distance from the tragus to the antihelix. The region of the panel 210 that vibrates preferably has a length corresponding to the distance from a position in the helix near the superior antihelix crus to the earlobe and a width corresponding to the distance from the tragus to a position in the helix near the antihelix.

In this example, the direction of length is a longitudinal direction 22a in which the panel 210 extends. Along this direction, the piezoelectric elements 230 and 231 are disposed toward one end from the center of the panel 210. The direction of width is a direction 22b orthogonal to the longitudinal direction. The region with such a length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 210 is at least as large as the average size of a Japanese person's ear, it is thought that the panel 210 will be a size capable of covering the entire ear of most non-Japanese people. By including a region with the above-described dimensions and shape, the panel 210 can cover the user's ear and has tolerance for misalignment when placed against the ear. This region includes at least the region from the lower edge of the piezoelectric elements 230 and 231 to the midpoint of the panel 210 in the longitudinal direction 22a.

By vibration of the panel 210, the electronic device 21 can transmit vibration sound transmitted through a part of the user's body (such as the cartilage of the outer ear) and air-conducted sound to the user. In this example, the panel 210 is the vibration unit. Therefore, when sound is output at a volume equivalent to a known dynamic receiver, the sound that is transmitted to the periphery of the electronic device 21 by air vibrations due to vibration of the panel 210 is smaller than with a dynamic receiver. Accordingly, the electronic device 21 is appropriate for listening to recorded messages, for example, on the train or the like.

The electronic device 21 transmits vibration sound by vibration of the panel 210, and therefore even if the user is wearing earphones or headphones, for example, the user can hear sound through the earphones or headphones and through a part of the body by contacting the electronic device 21 against the earphones or headphones.

The electronic device 21 transmits sound to a user by vibration of the panel 210. Therefore, if the electronic device 21 is not provided with a separate dynamic receiver, it is unnecessary to form an opening (sound discharge port) for sound transmission in the housing, thereby simplifying waterproof construction of the electronic device 21. On the other hand, if the electronic device 21 is provided with a dynamic receiver, the sound discharge port may be blocked by a member permeable by gas but not liquid. Gore-Tex (registered trademark) is an example of a member permeable by gas but not liquid.

Embodiment 5

Figure 20A:
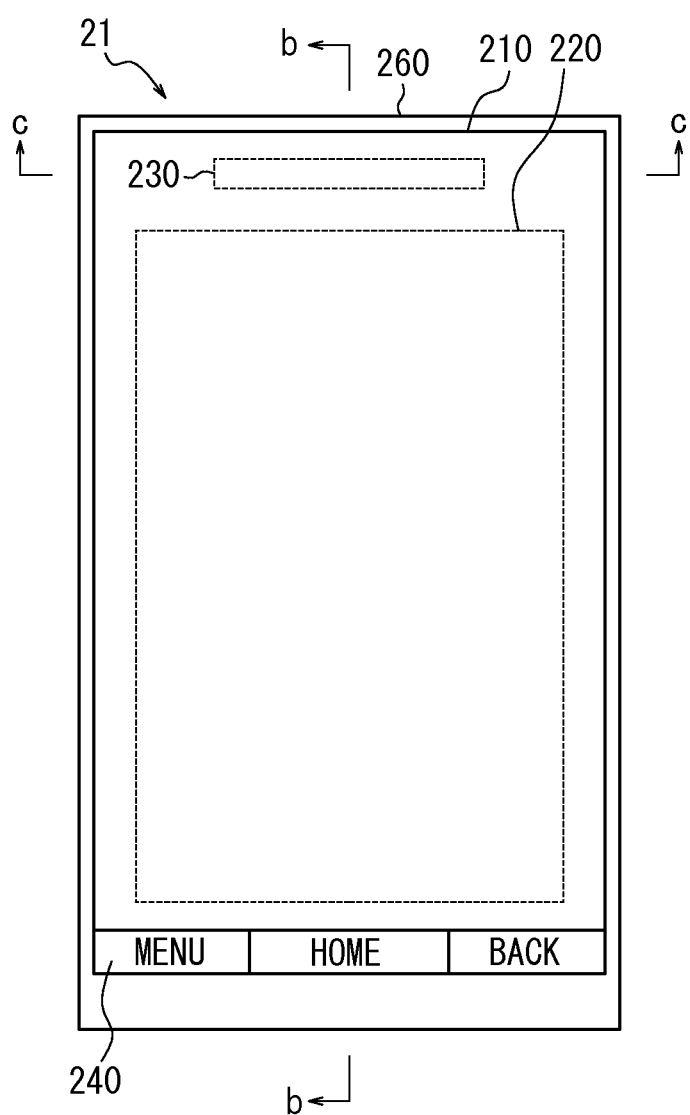
FIGS. 20A, 20B, and 20C illustrate a housing structure of an electronic device according to Embodiment 5.
Figure 20B:
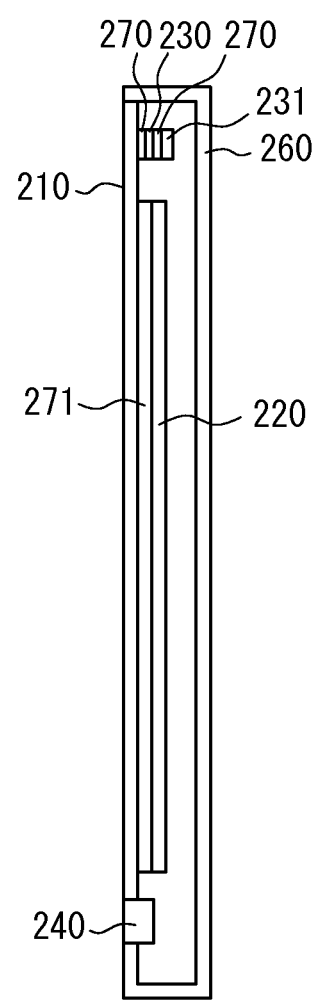
Figure 20C:
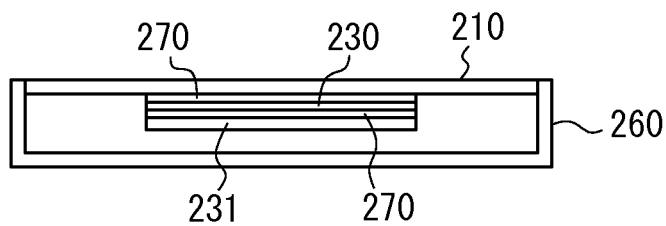

FIGS. 20A, 20B, and 20C illustrate a housing structure of the electronic device 21 according to Embodiment 5. FIG. 20A is a front view, FIG. 20B is a cross-sectional view along the b-b line of FIG. 20A, and FIG. 20C is a cross-sectional view along the c-c line of FIG. 20A. The electronic device 21 illustrated in FIGS. 20A to 20C is a smartphone in which a touch panel that is a glass plate is disposed on the front face of a housing 260 (for example a metal or resin case) as the panel 210.

The panel 210 and the input interface 240 are supported by the housing 260, and the display 220 and piezoelectric elements 230 and 231 are each attached to the panel 210. The panel 210, display 220, and piezoelectric element 230 are each generally rectangular.

The display 220 is disposed in approximately the center in the transverse direction of the panel 210 and is attached to the panel 210 by a joining member 271. The joining member 271 may be adhesive with thermosetting properties, ultraviolet curable properties, or other such properties and may, for example, be optical elasticity resin, which is clear and colorless acrylic ultraviolet curing adhesive. The display 220 is preferably adhered to the panel 210 over the entire surface in contact with the panel 210. The rigidity of a vibrating plate 2100 can thus be increased in a portion where the display 220 is adhered to the panel 210.

The piezoelectric elements 230 and 231 are disposed at a predetermined distance from an edge of the panel 210 in the longitudinal direction, near the edge so that the longitudinal direction of the piezoelectric elements 230 and 231 is aligned with the short sides of the panel 210. The display 220 and the piezoelectric elements 230 and 231 are disposed side by side, in parallel directions, on the inner face of the panel 210.

The piezoelectric elements 230 and 231 are stacked on and attached to the panel 210. For example, the first piezoelectric element 230 may be adhered to the panel 210 by a joining member 270. The second piezoelectric element 231 may also be stacked on and adhered to the first piezoelectric element 230 by the joining member 270. The joining member 270 is adhesive with thermosetting properties, ultraviolet curable properties, or other such properties; double-sided tape; or the like. The joining member 270 may, for example, be optical elasticity resin, which is clear and colorless acrylic ultraviolet curing adhesive. By using double-sided tape that has elasticity, a degree of freedom of deformation of each of the piezoelectric elements 230 and 231 can be guaranteed while making it difficult for the piezoelectric elements 230 and 231 to detach from the joining member due to deformation of the joining member caused by deformation of both of the piezoelectric elements 230 and 231. Alternatively, adhesive with thermosetting properties, ultraviolet curable properties, or other such properties may be used as the joining member 270. As a result, the piezoelectric elements 230 and 231 can be adhered in a state such that thermal stress contraction does not easily occur between the piezoelectric element 230 and the panel 210 or between the piezoelectric elements 230 and 231. Furthermore, the joining member 270 used between the piezoelectric element 230 and the panel 210 and the joining member 270 used between the piezoelectric elements 230 and 231 may be formed from different types of material.

When the piezoelectric elements 230 and 231 are, for example, laminated unimorph elements or laminated bimorph elements made from ceramic, the piezoelectric elements 230 and 231 deform more easily as they are thinner. In other words, as the piezoelectric element is thinner, it is less likely to damage due to an external force or due to its own deformation. On the other hand, as the piezoelectric element is made relatively thinner, the vibration of the panel 210 becomes relatively smaller. For example, comparing the case of vibrating the panel 210 with a 16-layer piezoelectric element and the case of vibrating the panel with a 24-layer piezoelectric element, the vibration of the panel 210 is less in the case of using a 16-layer piezoelectric element. In other words, the sound pressure of sound emitted from the panel 210 is smaller. For piezoelectric elements that have the same number of layers, the thickness of the piezoelectric elements differs if the thickness of the electrode and/or ceramic layers forming each piezoelectric element differs. The piezoelectric element deforms more easily as the ceramic layers are thinner. Conversely, as the ceramic layers are thicker, the piezoelectric element can vibrate the panel 210 more. Stating that "the piezoelectric elements each have a different thickness" in this disclosure does not refer to individual differences between piezoelectric elements.

In order to satisfy the contradictory demands for a thinner piezoelectric element in order to prevent damage and for a thicker piezoelectric element in order to increase sound pressure, a plurality of piezoelectric elements 230 and 231 are stacked on and attached to the panel 210 in the electronic device 21 according to Embodiment 5, and the piezoelectric elements 230 and 231 vibrate the panel 210. In this way, the thickness (or the number of layers corresponding to the thickness) of individual piezoelectric elements 230 and 231 can be reduced to prevent damage, while increasing the overall thickness (or the number of layers corresponding to the thickness) of the piezoelectric elements 230 and 231 to guarantee a large sound pressure. Furthermore, since the piezoelectric elements 230 and 231 are stacked on and attached to the panel 210, the volume occupied by the attachment location of the piezoelectric elements in the planar direction of the panel 210 can be reduced, so that the space within the housing along the planar direction of the panel 210 can be used effectively. The dimensions and shape of the piezoelectric elements 230 and 231 in the planar direction of the panel 210 may be the same or different.

When the piezoelectric elements 230 and 231 are stacked on and attached to the panel 210, then from the perspective of preventing damage to the piezoelectric elements 230 and 231, a comparison of the first piezoelectric element 230 that is closer to the panel 210 in the stacking direction with the second piezoelectric element 231 that is farther from the panel 210 depicts that the piezoelectric element 230 receives the effects of vibration of the panel 210 more directly than the piezoelectric element 231 and runs a greater risk of damage. Therefore, in Embodiment 5, the piezoelectric element 230 closer to the panel 210 is preferably thinner than the piezoelectric element 231. For example, when the piezoelectric elements 230 and 231 are laminated piezoelectric elements with the same number of layers, the thickness of each layer in the piezoelectric element 230 is set smaller than the thickness of each layer in the piezoelectric element 231. With this approach, while maintaining the same overall thickness, i.e. obtaining the same sound pressure, the risk of damage to the piezoelectric element 230 by an external force or the like can be reduced as compared to when, for example, the piezoelectric elements 230 and 231 each have the same thickness.

For example, when the piezoelectric elements 230 and 231 are laminated piezoelectric elements containing layers of the same thickness, the number of layers in the piezoelectric element 230 is set greater than the number of layers in the piezoelectric element 231. For example, the piezoelectric element 230 is provided with 12 layers, and the piezoelectric element 231 with 24 layers. With this approach, while maintaining the same total number of layers, i.e. obtaining the same sound pressure, the risk of damage to the piezoelectric element 230 by an external force or the like can be reduced as compared to when, for example, the piezoelectric elements 230 and 231 each have 18 layers for a total of 36 layers.

On the other hand, from the perspective of increasing the sound pressure, the thickness (or the number of layers corresponding to the thickness) of the first piezoelectric element 230 that is closer to the panel 210 in the stacking direction is preferably greater than the thickness (or the number of layers corresponding to the thickness) of the second piezoelectric element 231 that is farther from the panel 210. The risk of damage to the piezoelectric elements 230 and 231 can thus be reduced to a considerable extent while increasing the sound pressure as compared to when the piezoelectric elements 230 and 231 each have the same thickness. FIGS. 20A, 20B, and 20C only illustrate the case of the piezoelectric element 230 being thicker than the piezoelectric element 231. The opposite case is omitted from the drawings.

The piezoelectric elements 230 and 231 are separated from the inner surface of the housing 260 by a predetermined distance. The piezoelectric elements 230 and 231 are preferably separated from the inner surface of the housing 260 by the predetermined distance even when expanding and contracting or bending. In other words, the distance between the piezoelectric elements 230 and 231 and the inner face of the housing 260 is preferably larger than the maximum amount of deformation of the piezoelectric elements 230 and 231.

Figure 21:
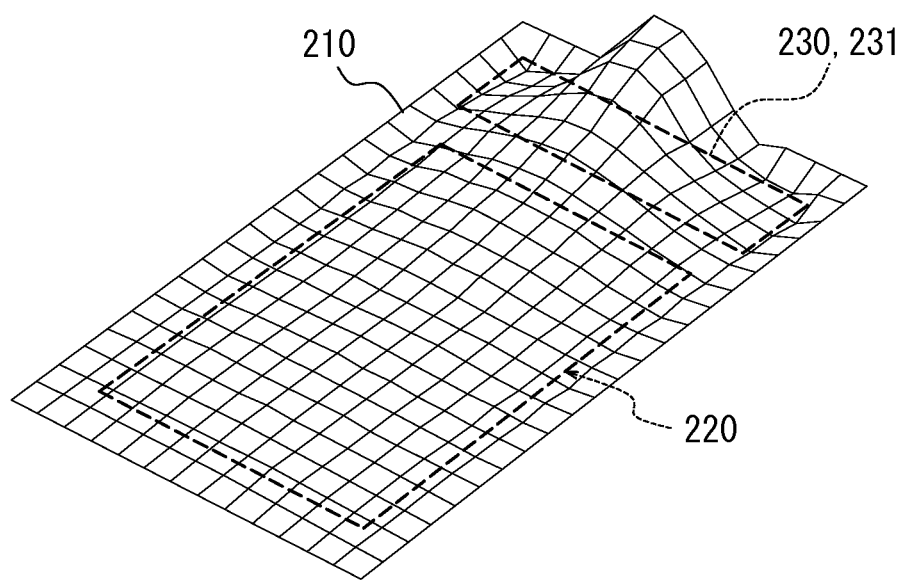
FIG. 21 illustrates an example of panel vibration in Embodiment 5.

FIG. 21 illustrates an example of vibration of the panel 210 in the electronic device 21 according to Embodiment 5. In the electronic device 21 according to Embodiment 5, the display 220 is attached to the panel 210. Therefore, it is more difficult for the lower part of the panel 210 to vibrate as compared to the upper part of the panel 210 where the piezoelectric elements 230 and 231 are attached. As a result, at the lower part of the panel 210, sound leakage due to vibration of the lower part of the panel 210 is reduced. The upper part of the panel 210 is bent directly by the piezoelectric elements 230 and 231, and hence vibration is damped at the lower part as compared to the upper part. In the direction of the long sides of the piezoelectric elements 230 and 231, the portion of the panel 210 immediately above the piezoelectric elements 230 and 231 rises the highest as compared to adjacent portions.

In the electronic device 21 according to Embodiment 5, the panel 210 thus deforms in conjunction with deformation of the piezoelectric elements 230 and 231 attached to the back face of the panel 210, so that air-conducted sound and vibration sound can be transmitted to an object that contacts the deforming panel 210. As a result, air-conducted sound and vibration sound can be transmitted to the user without projecting the vibration unit from the outer surface of the housing 260, thereby improving usability over the electronic device disclosed in PTL 1, in which a vibrating body extremely small as compared to the housing is pressed against a human body. The piezoelectric elements also do not damage easily, since the user's ear need not be pressed against the piezoelectric elements themselves. Moreover, causing the housing 260 rather than the panel 210 to deform makes it easier for the user to drop the terminal when vibration is generated, whereas vibrating the panel 210 makes such dropping of the terminal unlikely.

Embodiment 6

FIGS. 22A, 22B, and 22C illustrate a housing structure of the electronic device 21 according to Embodiment 6. FIG. 22A is a front view, FIG. 22B is a cross-sectional view along the b-b line of FIG. 22A, and FIG. 22C is a cross-sectional view along the c-c line of FIG. 22A. The electronic device 21 illustrated in FIGS. 22A to 22C is a clamshell mobile phone in which a cover panel (an acrylic plate) protecting the display 220 is disposed on the front face at the upper side of the housing 260 as the panel 210.

In Embodiment 6, a reinforcing member 280 is disposed between the panel 210 and the piezoelectric element 230. The reinforcing member 280 is, for example, an elastic member such as rubber, silicone, or the like. The reinforcing member 280 may, for example, be a metal plate formed from aluminum or the like and having a certain degree of elasticity. The reinforcing member 280 may also, for example, be a resin plate. Examples of the resin used to form such a resin plate include a polyamide resin. Examples of a polyamide resin include Reny (registered trademark), which is formed from crystalline thermoplastic resin obtained from m-Xylylenediamine and adipic acid and has excellent strength and elasticity. Such a polyamide resin may be used as a base polymer and reinforced by glass fiber, metallic fiber, carbon fiber, or the like to yield a reinforced resin. The strength and elasticity may be appropriately adjusted in accordance with the amount of glass fiber, metallic fiber, carbon fiber, or the like added to the polyamide resin. The above-described reinforced resin may, for example, be formed by interweaving glass fiber, metallic fiber, carbon fiber, or the like into a substrate, impregnating the substrate with resin, and allowing the resin to harden. The reinforced resin may be formed by mixing finely cut fibers into liquid resin and then allowing the resin to harden. The reinforced resin may also be a laminate of a substrate with interwoven fiber and a resin layer.

The piezoelectric elements 230 and 231 are stacked on and attached to the panel 210. For example, the second piezoelectric element 231 and the first piezoelectric element 230 may be adhered by the joining member 270, the first piezoelectric element 230 and the reinforcing member 280 may be adhered by the joining member 270, and the reinforcing member 280 and the panel 210 may be adhered by the joining member 270. The joining member 270 is adhesive with thermosetting properties, ultraviolet curable properties, or other such properties; double-sided tape; or the like. The piezoelectric elements 230 and 231 are disposed at a predetermined distance from an edge of the panel 210 in the longitudinal direction, near the edge so that the longitudinal direction of the piezoelectric elements 230 and 231 is aligned with the short sides of the panel 210.

The thickness (or the number of layers corresponding to the thickness) of the first piezoelectric element 230 that is closer to the panel 210 in the stacking direction is set to be less than the thickness (or the number of layers corresponding to the thickness) of the piezoelectric element 231. As in Embodiment 5, the risk of damage to the piezoelectric elements 230 and 231 due to vibration of the panel 210 can thus be reduced while guaranteeing a sound pressure of a certain degree or greater.

Alternatively, the thickness (or the number of layers corresponding to the thickness) of the first piezoelectric element 230 that is closer to the panel 210 in the stacking direction may be set to be greater than the thickness (or the number of layers corresponding to the thickness) of the second piezoelectric element 231 that is farther from the panel 210. As in Embodiment 5, the risk of damage to the piezoelectric elements 230 and 231 can thus be suppressed while increasing the sound pressure. FIGS. 22A, 22B, and 22C only illustrate the case of the piezoelectric element 230 being thicker than the piezoelectric element 231. The opposite case is omitted from the drawings.

In Embodiment 6, the display 220 is supported by the housing 260. In other words, in the electronic device 21 according to Embodiment 6, the display 220 is adhered to a support 290, which is a portion of the housing 260, by a joining member 272. The support 290 is not limited to being a portion of the housing 260 and may be configured using metal, resin, or the like to be a member independent from the housing 260.

In the electronic device 21 according to Embodiment 6, the reinforcing member 280 and the panel 210 deform in conjunction with deformation of the piezoelectric elements 230 and 231 attached to the panel 210 via the reinforcing member 280, so that air-conducted sound and vibration sound are transmitted to an object that contacts the deforming panel 210. As a result, air-conducted sound and vibration sound can be transmitted to the user without the user's ear being pressed against the vibrating body itself. Furthermore, the piezoelectric elements 230 and 231 are attached to the surface of the panel 210 that faces the inside of the housing 260. Air-conducted sound and vibration sound can thus be transmitted to the user without projecting the vibrating body from the outer surface of the housing 260. Moreover, the panel 210 deforms not only in the region in which the piezoelectric elements 230 and 231 are attached, but rather throughout the panel 210 in order to transmit air-conducted sound and vibration sound. Therefore, in addition to hearing air-conducted sound through the air, the user can hear vibration sound by contacting the ear to any position on the panel 210.

Disposing the reinforcing member 280 between the piezoelectric element 230 and the panel 210 can further reduce the probability of an external force being transmitted to and damaging the piezoelectric elements 230 and 231 if, for example, such a force is applied to the panel 210. Moreover, even if the panel 210 is pressed firmly against a human body, vibration of the panel 210 does not dampen easily. By disposing the reinforcing member 280 between the piezoelectric element 230 and the panel 210, the resonance frequency of the panel 210 also decreases, thereby improving the acoustic characteristics in the low frequency band. Note that instead of the reinforcing member 280, a plate-shaped anchor may be attached to the piezoelectric element 230 by the joining member 270.

Figure 23:
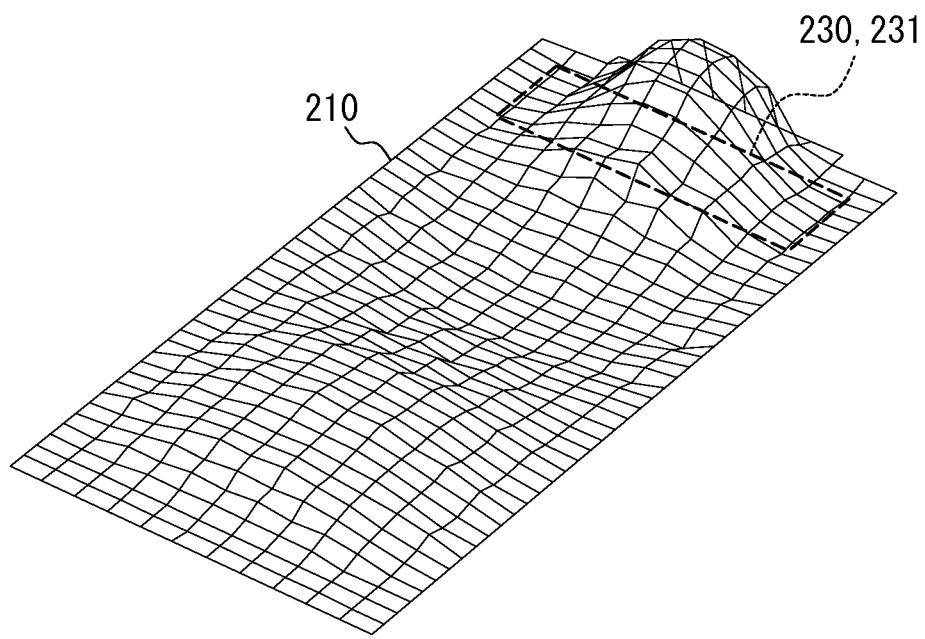
FIG. 23 illustrates an example of panel vibration in Embodiment 6.

FIG. 23 illustrates an example of vibration of the panel 210 in the electronic device 21 according to Embodiment 6. In the electronic device 21 according to Embodiment 6, the panel 210 is an acrylic plate with lower rigidity than a glass plate, and the display 220 is not adhered to the back face of the panel 210. Therefore, as compared to the electronic device 21 according to Embodiment 5, the amplitude produced by the piezoelectric elements is greater. Moreover, the panel 210 vibrates not only in the region in which the piezoelectric elements are attached, but also in a region separate from the attachment region. Therefore, in addition to hearing air-conducted sound through the air, the user can hear vibration sound by contacting the ear to any position on the panel 210.

Although this disclosure is based on embodiments and drawings, it is to be noted that various changes and modifications will be apparent to those skilled in the art based on this disclosure. Therefore, such changes and modifications are to be understood as included within the scope of this disclosure. For example, the functions and the like included in the various members may be reordered in any logically consistent way. Furthermore, components may be combined into one or divided.

Figure 24:
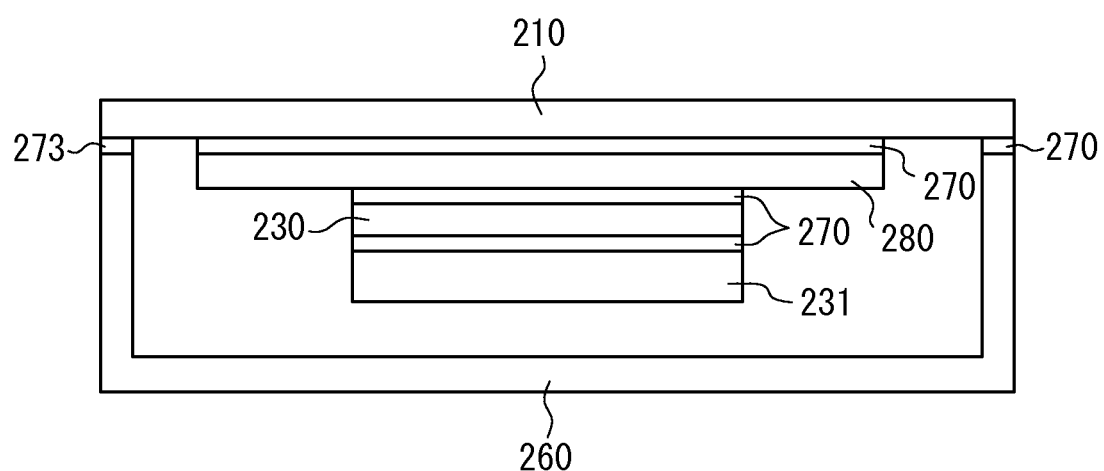
FIG. 24 illustrates an example of a panel support structure.

For example, as illustrated by the cross-section of the housing 260 in FIG. 24, the panel 210 may be adhered to the housing 260 by a joining member 273. Making it difficult for vibration to be transmitted directly from the panel 210 to the housing 260 in this way reduces the risk of the user dropping the electronic device 21 as compared to when the housing itself vibrates significantly. The joining member 273 may be a non-heat hardening adhesive. Such adhesive has the advantage that, during hardening, thermal stress contraction does not easily occur between the housing 260 and the panel 210. The joining member 273 may also be double-sided tape. Such tape has the advantage that the contraction stress when using adhesive is not easily produced between the housing 260 and the panel 210.

For example, when the panel 210 and the display 220 do not overlap, the piezoelectric elements 230 and 231 may be disposed at the center of the panel 210. When the piezoelectric elements 230 and 231 are disposed at the center of the panel 210, vibration of the piezoelectric elements 230 and 231 is transmitted uniformly across the entire panel 210, thereby improving the quality of air-conducted sound and permitting recognition of vibration sound when the user contacts the ear to any of various positions on the panel 210.

In Embodiments 5 and 6, the piezoelectric elements 230 and 231 are illustrated as examples, but the number of piezoelectric elements may be three or more. In this case, by increasing the thickness (number of layers) in accordance with distance from the panel 210 in the stacking direction, the risk of damage to the piezoelectric elements can be reduced while guaranteeing sound pressure. Alternatively, by reducing the thickness (number of layers) in accordance with distance from the panel 210, the risk of damage to the piezoelectric elements can be suppressed while increasing the sound pressure. Furthermore, while the number of layers in the piezoelectric elements is 16 or 24 in the examples described above, the number of layers is not limited to these examples and may be any number.

By attaching the piezoelectric elements to any of a display panel, operation panel, cover panel, or lid panel that allows for removal of a rechargeable battery instead of attaching the piezoelectric elements to the panel 210, the member to which the piezoelectric elements are attached may be vibrated and caused to function as the vibration unit. When the panel 210 is a display panel, the piezoelectric elements 230 and 231 may be disposed on the outside of a display region fulfilling a display function. This offers the advantage of not blocking the display. The operation panel includes the touch panel of Embodiment 5. The operation panel also includes a sheet key, in which the tops of operation keys are integrally formed in, for example, a clamshell mobile phone so as to constitute one face of the housing at the operation interface side.

The type of joining members 270 to 273 used in Embodiment 5 and Embodiment 6 may be selected in accordance with the member to be adhered.

REFERENCE SIGNS LIST 1, 11, 21 Electronic device
10, 110, 210 Panel
20, 120, 220 Display
30, 130, 230, 31, 131, 231 Piezoelectric element
40, 140, 240 Input interface
50, 150, 250 Controller
60, 160, 260 Housing
70-73, 170-173, 270-273 Joining member
80, 180, 280 Reinforcing member
90, 190, 290 Support

The invention claimed is:

1. An electronic device comprising:
a vibration unit configured to generate a vibration sound transmitted by vibrating a contacting or pressing body part; and
a plurality of piezoelectric elements stacked on and attached to the vibration unit and vibrating the vibration unit in accordance with an input signal, the piezoelectric elements each having a different capacitance, wherein
voltage of the input signal to the piezoelectric elements is varied in accordance with frequency band.

2. The electronic device of claim 1, wherein
a first signal is input to a first piezoelectric element, a second signal is input to a second piezoelectric element that has a larger capacitance than the first piezoelectric element, voltage of the second signal is equal to or greater than voltage of the first signal in a first frequency band, and the voltage of the second signal is less than the voltage of the first signal in a second frequency band that is higher than the first frequency band.

3. The electronic device of claim 1, further comprising:
a controller configured to control the voltage of the input signal to the piezoelectric elements.

4. The electronic device of any one of claim 1, wherein
the piezoelectric elements each have a different shape.

5. The electronic device of claim 4, wherein
the piezoelectric elements are rectangular, and each piezoelectric element has at least one side with a different length.

6. The electronic device of claim 4, wherein
the piezoelectric elements each have a different thickness in a stacking direction.

7. The electronic device of claim 6, wherein
the piezoelectric elements are laminated piezoelectric elements each having a different number of layers.

8. The electronic device of any one of claim 1, wherein
the vibration unit is a panel.

9. The electronic device of claim 8, wherein
the vibration unit is larger than an ear.

10. The electronic device of claim 8, wherein
the vibration unit comprises a display.

11. The electronic device of claim 10, wherein
the piezoelectric elements are attached to a different position than an attachment position of the display in the vibration unit.

12. The electronic device of any one of claim 1, wherein
the vibration unit transmits the vibration sound by vibrating a pressing body part even when the vibration unit is pressed by the body part with a force of 3 N or more.

13. The electronic device of any one of claim 1, wherein
the vibration unit transmits the vibration sound by vibrating a pressing body part even when the vibration unit is pressed by the body part with a force of 5 N or more.

14. The electronic device of any one of claim 1, wherein
the vibration unit transmits the vibration sound by vibrating a pressing body part even when the vibration unit is pressed by the body part with a force of 10 N or less.

* * * * *